(12) United States Patent
Sugaya et al.

(10) Patent No.: US 11,805,311 B2
(45) Date of Patent: Oct. 31, 2023

(54) ELECTRONIC APPARATUS

(71) Applicant: CANON KABUSHIKI KAISHA, Tokyo (JP)

(72) Inventors: Kazuki Sugaya, Tokyo (JP); Yohei Yamada, Tokyo (JP); Keisuke Fukuyo, Tokyo (JP); Takashi Yoshida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/670,114

(22) Filed: Feb. 11, 2022

(65) Prior Publication Data

US 2022/0272266 A1 Aug. 25, 2022

(30) Foreign Application Priority Data

Feb. 19, 2021 (JP) .................. 2021-025108

(51) Int. Cl.
*H04N 23/63* (2023.01)
*G06F 3/041* (2006.01)
(Continued)

(52) U.S. Cl.
CPC ............. *H04N 23/63* (2023.01); *G06F 3/041* (2013.01); *G06F 3/1423* (2013.01); *G06T 7/70* (2017.01);
(Continued)

(58) Field of Classification Search
CPC ...... H04N 23/63; H04N 23/45; H04N 23/531; H04N 23/667; G06F 3/041; G06F 3/1423; G06T 7/70; G09G 2380/02; G09G 2340/0414; G09G 2340/0421; G09G 2340/045; G09G 2340/0442
See application file for complete search history.

(56) References Cited

U.S. PATENT DOCUMENTS 10,535,825 B2 1/2020 Tanaka
2006/0012951 A1* 1/2006 Kim ...................... G06F 1/1641
361/679.04

(Continued)

FOREIGN PATENT DOCUMENTS

JP 2007-180663 A 7/2007
WO 2018/138779 A1 8/2018

*Primary Examiner* — Timothy J Henn
(74) *Attorney, Agent, or Firm* — Cowan, Liebowitz & Latman, P.C.

(57) ABSTRACT

A display of an electronic apparatus includes first to third display portions that at least partially have flexibility and are integrally configured. The display has a first bending portion at a boundary between the first display portion and the second display portion and has a second bending portion at a boundary between the second display portion and the third display portion. A first hinge portion is relatively rotatably coupled to the first and second display portions. A second hinge portion is relatively rotatably coupled to the second and third display portions. The display is configured to be bendable at each bending portion as a start point in response to rotation of each hinge portion. The first bending portion and the second bending portion do not intersect each other and substantially perpendicularly intersect on extended lines of the first bending portion and the second bending portion.

9 Claims, 22 Drawing Sheets

(51) Int. Cl.
*G06F 3/14* (2006.01)
*G06T 7/70* (2017.01)
*H04N 23/45* (2023.01)
*H04N 23/53* (2023.01)
*H04N 23/667* (2023.01)

(52) U.S. Cl.
CPC ........... *H04N 23/45* (2023.01); *H04N 23/531* (2023.01); *H04N 23/667* (2023.01); *G09G 2380/02* (2013.01)

(56) References Cited

U.S. PATENT DOCUMENTS

2007/0279315 A1* 12/2007 Laves ................ H04M 1/0268
345/1.1
2014/0285992 A1* 9/2014 Yang .................... G06F 1/1641
29/592.1
2020/0027425 A1* 1/2020 Lee .................... G06F 3/04817
2020/0329573 A1* 10/2020 Huang ................ G06F 1/1652

* cited by examiner

652(200b/200c)  653(211) 651

662(200a/200b)

ELECTRONIC APPARATUS

BACKGROUND OF THE INVENTION

Field of the Invention

The present invention relates to an electronic apparatus including a bendable display device.

Description of the Related Art

Electronic apparatuses such as digital cameras and smartphones include liquid crystal displays that have a touch operation function in apparatus main bodies and display portions configured with thinner organic ELs or the like. In recent years, the size of apparatus main bodies has been reduced while displays have increased in size and there is demand to further increase the size of display portions and to obtain multiple displays that enable simultaneous viewing of a plurality of screens. Thus, there is a method of performing switching between an accommodated state in which the size of an apparatus is small and an unfolded state in which a display portion is large, by causing a display portion with flexibility to bend, thus allowing both portability and viewability.

International Publication No. 2018/138779 discloses a display that includes a plurality of bending portions having flexibility and extending in directions intersecting each other and that includes a through-hole provided at a folding center portion at which the bending portions intersect each other. Japanese Patent Laid-Open No, 2007-180663 discloses a technique of providing a mechanism that causes a display control device provided in an imaging device to rotate and controlling a rotation angle of a display device from inclination angle information and height information of the imaging device.

According to the related art, it is difficult to improve visual quality and viewability in a case in which multiple displays are obtained without causing an increase in size of an electronic apparatus. Also, there is a probability that if it takes time to change a posture of a display device, visibility of a display screen will be degraded in a configuration in which the display device is mechanically operated.

SUMMARY OF THE INVENTION

An electronic apparatus according to an embodiment of the present invention is an electronic apparatus including: a display that at least partially has flexibility; and a main body portion, in which the display includes a plurality of display portions, has a bending portion at each of boundaries of the plurality of display portions, and is configured to be bendable at the bending portion as a start point in response to rotation of a hinge portion that is relatively rotatably coupled to first and second display portions and a hinge portion that is relatively rotatably coupled to second and third display portions among the plurality of display portions, a first bending portion at a boundary between the first display portion and the second display portion and a second bending portion at a boundary between the second display portion and the third display portion do not intersect each other and substantially perpendicularly intersect on extended lines of the bending portions.

Further features of the present invention will become apparent from the following description of exemplary embodiments with reference to the attached drawings.

DESCRIPTION OF THE EMBODIMENTS

Hereinafter, preferred embodiments of the present invention will be described in detail on the basis of the accompanying drawings. In the embodiments, an example in which an electronic apparatus according to the present invention is applied to an imaging apparatus will be illustrated.

First Embodiment

Figure 1A:
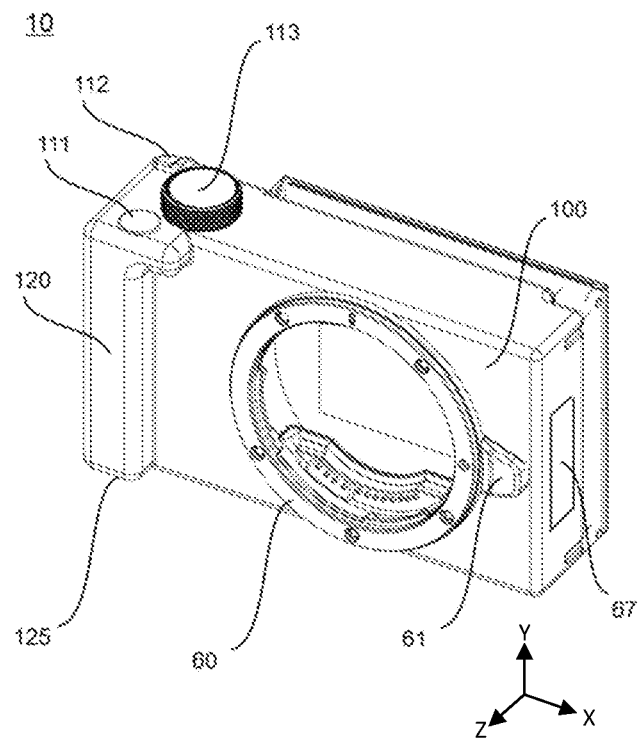
FIGS. 1A and 1B are appearance perspective views of a camera according to a first embodiment.
Figure 1B:
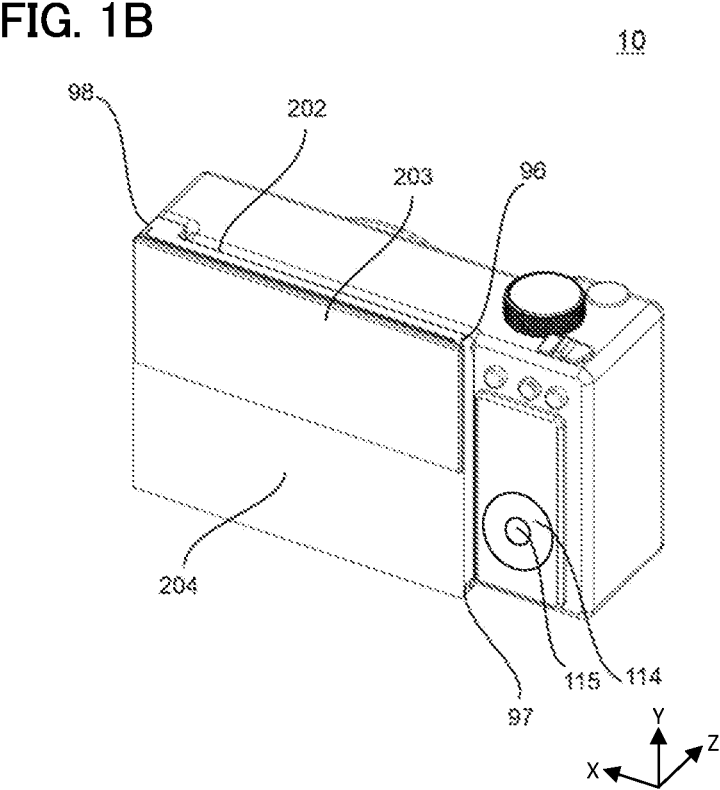
Figure 2:
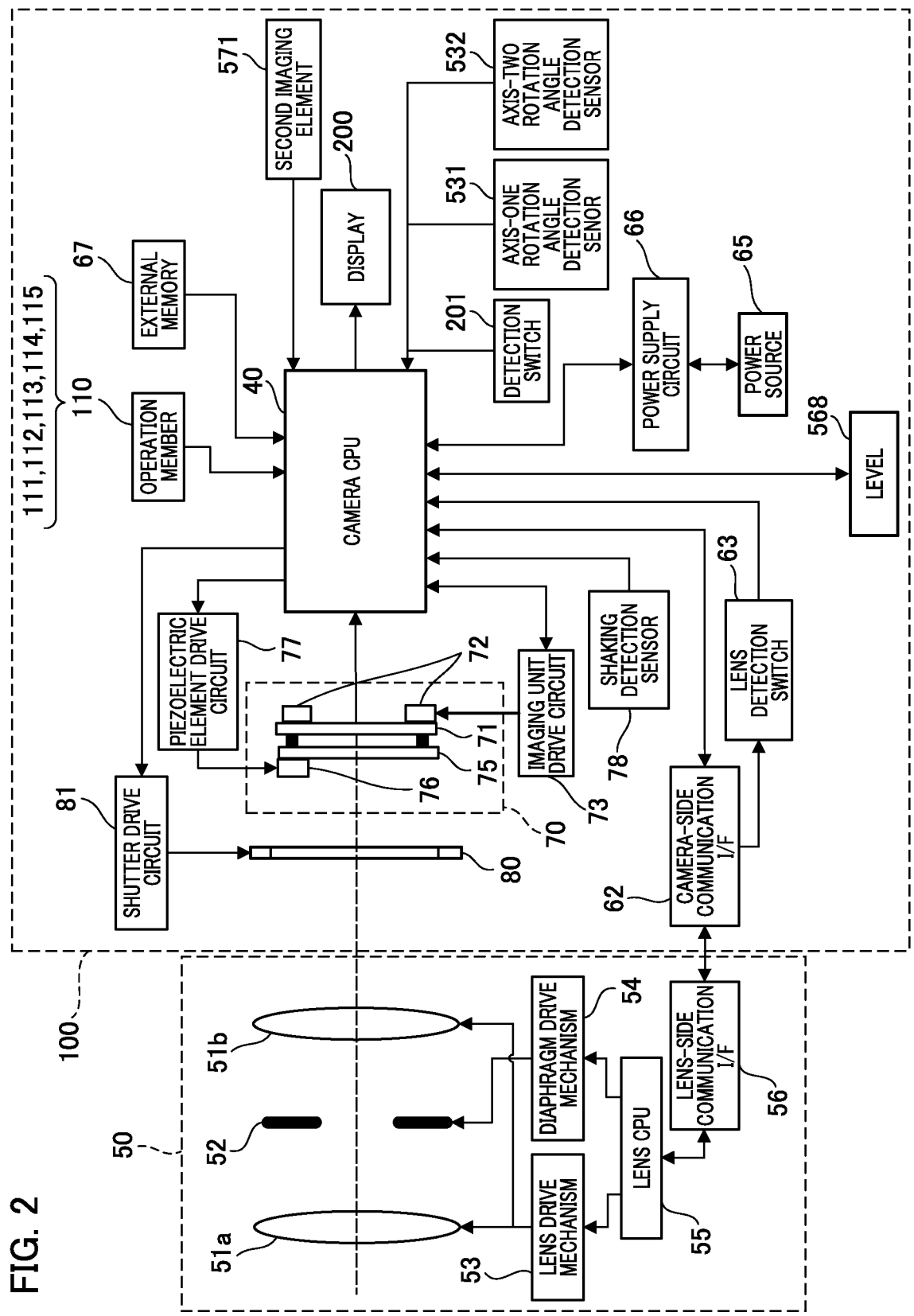
FIG. 2 is a block diagram illustrating a functional configuration of the camera according to the first embodiment.

A camera 10 according to the present embodiment will be described with reference to FIGS. 1A, 1B, and 2. An example of an imaging apparatus capable of switching display positions on a display on the basis of a posture detection result will be illustrated. FIG. 1A is an appearance perspective view of the camera 10 when seen from the front side. FIG. 1B is an appearance perspective view of the camera 10 when seen from the rear side. A direction that is parallel to the optical axis of the camera 10 will be defined as a Z-axis direction, and an X-axis direction and a Y-axis direction that perpendicularly intersect the Z-axis direction will be defined. In FIGS. 1A and 1B, the Y-axis direction corresponds to the up-down direction, and the X-axis direction corresponds to the left-right direction. FIG. 2 is a block diagram illustrating a functional configuration of the camera 10.

The camera 10 illustrated in FIGS. 1A, 1B and 2 is a digital camera of a lens replacement type. The camera 10 includes a grip portion 120 in a main body portion 100 that is a casing. FIG. 1A illustrates the main body portion 100 in a state in which a replacement lens unit is not attached. The grip portion 120 is a gripping portion for a user to hold the camera 10. The grip portion 120 is provided at least at one end of the main body portion 100 and is formed into a curved surface shape such that the user can hold the grip portion so as to cover it in his/her palm and hook his/her fingers. It is possible to obtain satisfactory gripping properties by forming the surface of the grip portion 120 by an elastic member such as synthetic rubber.

A lens unit 50 (FIG. 2) constitutes an imaging optical system and includes a focus lens 51a and a zoom lens 51b constituted by a plurality of lens groups. A configuration in which the lens unit 50 can be attached to and detached from a mounting opening 60 in a front surface of the camera 10 through a pressing operation of a lens attachment/detachment button 61. The lens unit 50 includes a diaphragm 52 for adjusting the aperture amount. A lens drive mechanism 53 drives the focus lens 51a and the zoom lens 51b and performs focusing and zoom driving. A diaphragm drive mechanism 54 drives the diaphragm 52 and controls an aperture value. A lens central processing unit (CPU) 55 performs various kinds of signal processing and controls each portion in the lens unit 50.

The main body portion 100 and the lens unit 50 in the camera 10 are electrically connected to each other via a camera-side communication interface (I/F) portion 62 and a lens-side communication I/F portion 56 and can communicate with each other. Also, power is supplied from the main body portion 100 to the lens unit 50. A lens detection switch 63 included in the main body portion 100 determines whether or not the main body portion 100 and the lens unit 50 in the camera 10 can communicate with each other via the camera-side communication I/F portion 62 and the lens-side communication I/F portion 56. Also, the lens detection switch 63 can identify the type of the lens unit 50 attached to the main body portion 100 of the camera 10.

The camera CPU 40 performs operation control of each component in the camera 10. Hereinafter, the camera CPU 40 will be simply referred to as a CPU 40. A power source 65 supplies power to each component in the camera 10. The power source 65 is a secondary battery constituted by a battery pack that can be attached to and detached from the camera 10. A power supply circuit 66 converts a voltage of the power source 65 into a voltage necessary for operations of each component in the camera 10.

The shutter 80 is constituted by a focal plane shutter and performs incidence control of an imaging light flux through exposure and blocking of a first imaging element 71. A shutter drive circuit 81 causes a shutter curtain (not illustrated) to perform opening and closing operations, and it is thus possible to transition to and hold an exposed state (opened state) or a blocked state (closed state) of the first imaging element 71.

The first imaging element 71 takes an imaging light flux from the lens unit 50 and performs photoelectric conversion. A complementary metal oxide semiconductor (CMOS) image sensor or a charge coupled diode (CCD) image sensor is used as the first imaging element 71, and the first imaging element 71 has an electronic shutter function. A rectangular optical low-pass filter 75 made of a material such as crystal quartz is disposed in a front surface of the first imaging element 71. A piezoelectric element 76 is adhesively held on the surface of the optical low-pass filter 75 and causes the optical low-pass filter 75 to vibrate in a waveform manner in the Z-axis direction by applying a voltage thereto. A piezoelectric element drive circuit 77 that controls power distribution to the piezoelectric element 76 is electrically connected to the piezoelectric element 76 via a piezoelectric element flexible substrate, which is not illustrated. It is possible to cause the optical low-pass filter 75 to vibrate in a plurality of vibration modes of different orders through the control of power distribution to the piezoelectric element 76. It is thus possible to remove dust adhering to the surface of the optical low-pass filter 75.

A shaking detection sensor 78 is, for example, an angular speed sensor, periodically detects an angular speed of the camera 10, and converts the angular speed into an electrical signal. An output of the shaking detection sensor 78 is acquired by the CPU 40 as a detection signal of the shake amount of the camera 10.

An imaging unit drive mechanism 72 drives the first imaging element 71. The imaging unit 70 includes the first imaging element 71, the optical low-pass filter 75, the piezoelectric element 76, and the imaging unit drive mechanism 72. A drive coil (not illustrated), a permanent magnet (not illustrated), and a position detection sensor (not illustrated) for driving the first imaging element 71 on a plane (X-Y plane) that perpendicularly intersects the optical axis of the camera 10 are provided. The imaging unit drive circuit 73 is electrically connected to the imaging unit drive mechanism 72 via an imaging unit drive mechanism flexible substrate, which is not illustrated, and controls power distribution to the imaging unit drive mechanism 72. The CPU 40 can correct image shaking by driving the imaging unit 70 in a direction in which the shaking of the camera 10 is decreased, in accordance with the detection result of the shaking detection sensor 78. An external memory 67 is constituted by a semiconductor memory card or the like that can be attached to and detached from the main body portion 100 and records data of captured images.

A second imaging element 571 takes imaging light from a lens, which is not illustrated, different from the lens unit 50 and performs photoelectric conversion thereof. The second imaging element 571 is a CMOS image sensor, a CCD image sensor, or the like and is disposed in a display 200.

A level 568 is an electronic level that detects an inclination of the camera 10 and detects a posture of the camera 10. The level 568 detects a positive value when the lens unit 50 is directed upward relative to the main body portion 100 and detects a negative value when the lens unit 50 is located on the lower side relative to the main body portion 100. The level 568 outputs the result of detecting the posture of the camera 10 to the CPU 40.

The display 200 includes a display device (for example, an organic electro-luminescence (EL) element) provided on the back surface of the camera 10. The display 200 performs display of a through-the-lens image captured by the first imaging element 71, display of settings of the main body portion 100, display of a captured image, and the like. The display 200 at least partially has flexibility and has a bendable configuration. Also, the display 200 has a touch panel function. In other words, a touch detection portion of an electrostatic capacitance type or a pressure sensitive type is incorporated, and the user can perform touch operations with a finger or the like. Note that details of the configuration of the display 200 will be described later.

The display 200 is attached to a first holding member 502, a second holding member 503, and a third holding member 504 (see FIGS. 3A and 3B) formed through pressing of a sheet metal material or molding of a resin material. The detection switch 201 is constituted by a magnet, a Hall element, and the like and detects relative positions of the first holding member 502, the second holding member 503, the third holding member 504 and the main body portion 100. The detection switch 201 outputs a detection signal to the CPU 40.

An axis-one rotation angle detection sensor 531 detects a relative opening/closing angle between the first holding member 502 and the second holding member 503. An axis-two rotation angle detection sensor 532 detects a relative opening/closing angle between the first holding member 502 and the third holding member 504. The axis-one rotation angle detection sensor 531 and the axis-two rotation angle detection sensor 532 output detection results to the CPU 40.

The CPU 40 performs control by receiving instructions from various operation members 110. Also, the CPU 40 performs control to switch the display position of the display 200 based on the posture of the camera 10. A plurality of buttons, dials, and the like used by the user to perform setting of the main body portion 100 and imaging operations are provided in a top surface and a rear surface of the main body portion 100. Specifically, a shutter button 111 for performing imaging operations, a power switch 112 for switching the power source to on and off, and a mode dial 113 for switching an imaging mode are included as illustrated in FIG. 1A. Also, a selection button 114 for selecting various kinds of setting and a settings button 115 for determining various kinds of settings are included as illustrated in FIG. 1B.

A first hinge portion 96 relatively rotatably couples the first holding member 502 and the second holding member 503. A second hinge portion 97 relatively rotatably couples the first holding member 502 and the third holding member 504. Note that details of the configurations of the first hinge portion 96 and the second hinge portion 97 will be described later. A coupling member 98 relatively rotatably couples the main body portion 100 and the first holding member 502. The coupling member 98 constitutes a coupling portion that couples the first holding member 502 to the main body portion 100. The coupling portion is rotatable about an axis that is substantially perpendicular to first and second bending portions, which will be described later.

Figure 3A:
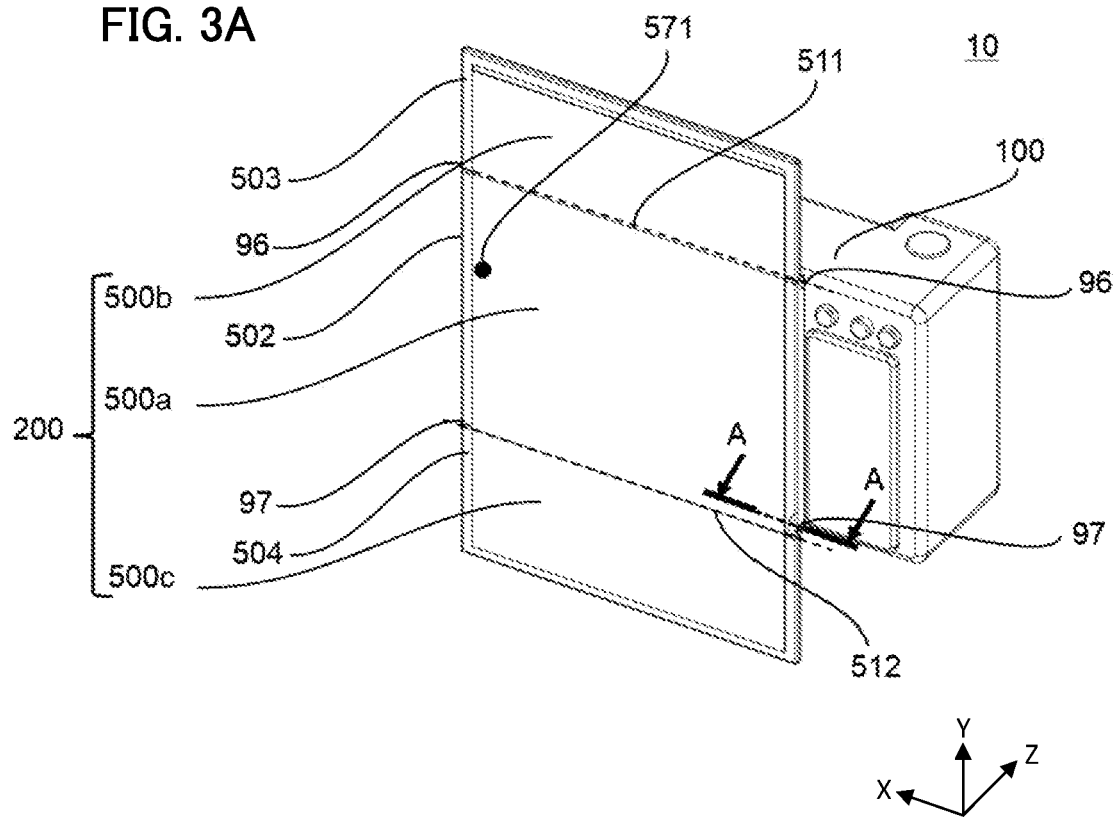
FIGS. 3A and 3B are appearance perspective views illustrating an unfolded state and an accommodated state of display.
Figure 3B:
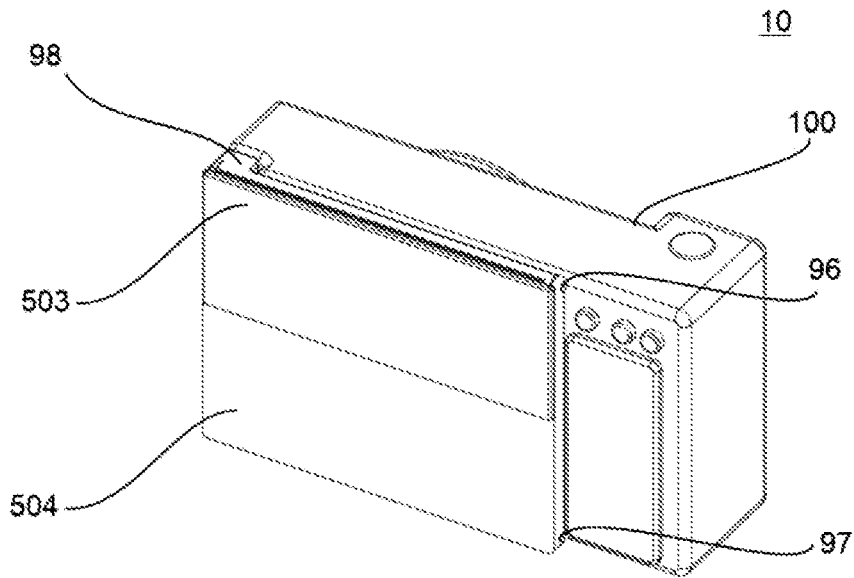
Figure 4:
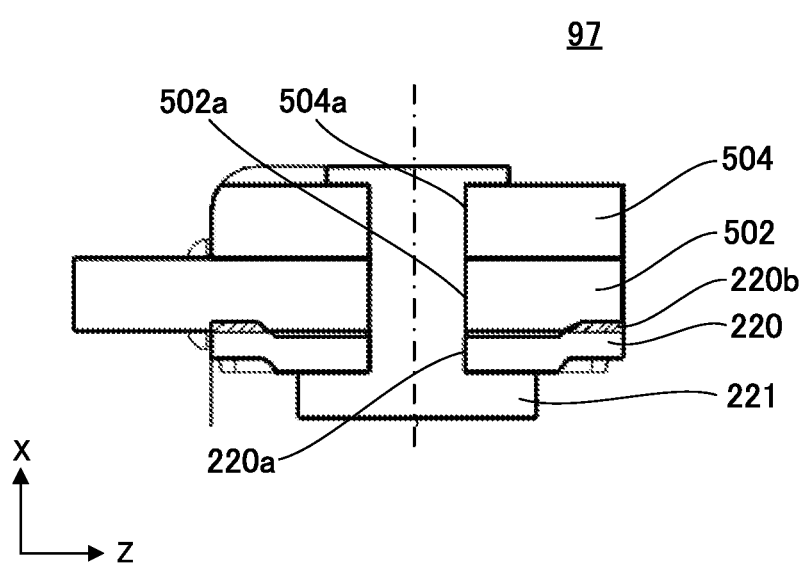
FIG. 4 is a sectional view illustrating a second hinge portion.

Next, a configuration that enables the display 200 to be bent will be described with reference to FIGS. 3A, 3B, and 4. FIG. 3A is an appearance perspective view of the display 200 in the unfolded state when seen from the side to the rear. FIG. 3B is an appearance perspective view of the display 200 according to the present embodiment in an accommodated state when seen from the rear side. FIG. 4 is a sectional view illustrating the second hinge portion 97 along A-A in FIG. 3A.

In FIGS. 3A and 3B, the display 200 constituted by an organic EL or the like has a rectangular shape and is formed of a thin film-shaped material. The display 200 has a bending portion at each of boundaries of the plurality of display portions. The display 200 is configured to be bendable at a first bending portion 511 and a second bending portion 512 provided at positions in the longitudinal direction (the Y-axis direction in FIGS. 3A and 3B). The display 200 is sectioned into a first display portion 500a, a second display portion 500b, and a third display portion 500c virtually split by the first bending portion 511 and the second bending portion 512. In other words, the first bending portion 511 is provided at the boundary between the first display portion 500a and the second display portion 500b, and the second bending portion 512 is provided at the boundary between the first display portion 500a and the third display portion 500c.

The first hinge portion 96 is provided at a position corresponding to each of both ends of the first bending portion 511 in the X-axis direction in the drawing. Also, the second hinge portion 97 is provided at a position corresponding to each of both ends of the second bending portion 512 in the X-axis direction in the drawing.

Next, a detailed configuration of the second hinge portion 97 will be described with reference to FIG. 4. Note that since the same configuration as that of the second hinge portion 97 is employed for the first hinge portion 96 and the coupling member 98 in the present embodiment, only the configuration of the second hinge portion 97 will be described.

In FIG. 4, a first insertion hole 502a is formed in the X-axis direction in the drawing in the first holding member 502. A third insertion hole 504a is formed in the X-axis direction in the drawing in the third holding member 504. A disc spring 220 is formed through pressing or the like of a sheet metal material. Also, the disc spring 220 is provided with a biasing portion 220b formed into a projecting shape in the X-axis direction in the drawing on a part of the external diameter thereof.

A shaft 221 formed of metal and having a shaft-shaped portion is inserted into the insertion hole 220a, the first insertion hole 502a, and the third insertion hole 504a. It is possible to hold, in a pinched manner, the disc spring 220, the first holding member 502, and the third holding member 504 through cramping or the like of both end portions of the shaft 221.

In this manner, a configuration in which the first holding member 502 and the third holding member 504 are rotatable about the axial center of the shaft 221 is employed. As illustrated in FIG. 4, a configuration in which a frictional force is caused by pressing the biasing portion 220b against a part of the first holding member 502 and relative positions of the first holding member 502 and the third holding member 504 are held at desired positions is employed.

Although a so-called monoaxial hinge configuration in which the first holding member 502, the third holding member 504, and the disc spring 220 are held, in a pinched manner, by the shaft 221 is employed for the second hinge portion 97 in the present embodiment, other known techniques may be used. For example, there is a so-called biaxial hinge configuration in which the disc spring 220 and the shaft 221 are provided on each of the first holding member 502 and the third holding member 504 to couple the shafts 221. Also, the first holding member 502 and the third holding member 504 may be coupled to each other with an elastic member such as a synthetic rubber member.

In the present embodiment, the first bending portion 511 and the second bending portion 512 are provided at substantially the same positions as those of the first hinge portion 96 and the second hinge portion 97 in the longitudinal direction (the Y-axis direction in FIGS. 3A and 3B) of the display 200. In this manner, the display 200 is configured to be bent at the first bending portion 511 as a start point if the first holding member 502 and the second holding member 503 relatively rotate about the axis of the first hinge portion 96. Also, the display 200 is configured to be bent at the second bending portion 512 as a start point if the first holding member 502 and the third holding member 504 relatively rotate about the axis of the second hinge portion 97.

As described above, a configuration of being deformable into a state in which the display 200 is bent and accommodated (the state in FIG. 3B, which will be referred to as an accommodated state below) and a state in which the display 200 is unfolded (the state in FIG. 3A, which will be referred to as an unfolded state below) is employed.

In regard to sizes of the first display portion 500a, the second display portion 500b, and the third display portion 500c, it is desirable that the following relationship be satisfied.

The size of the first display portion 500a a total size of the second display portion 500b and the third display portion 500c.

In this manner, it is possible to protect the display 200 in the accommodated state of the display 200.

Figure 5A:
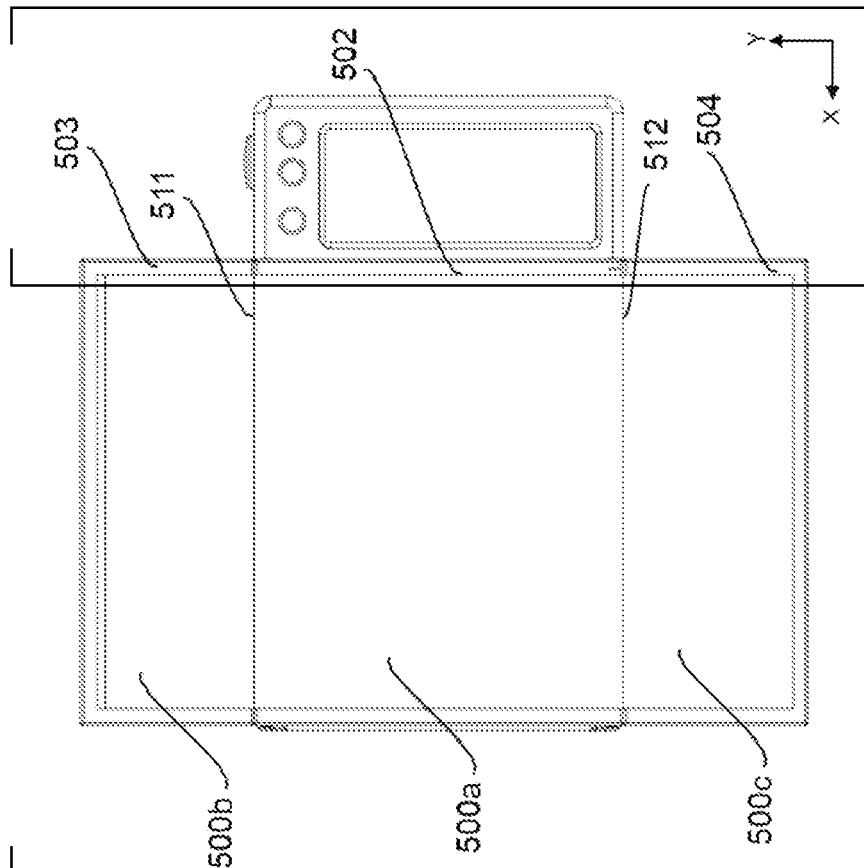
FIGS. 5A and 5B are diagrams of the display in a case of viewing the rear surface and a side surface thereof in an unfolded state.
Figure 5B:
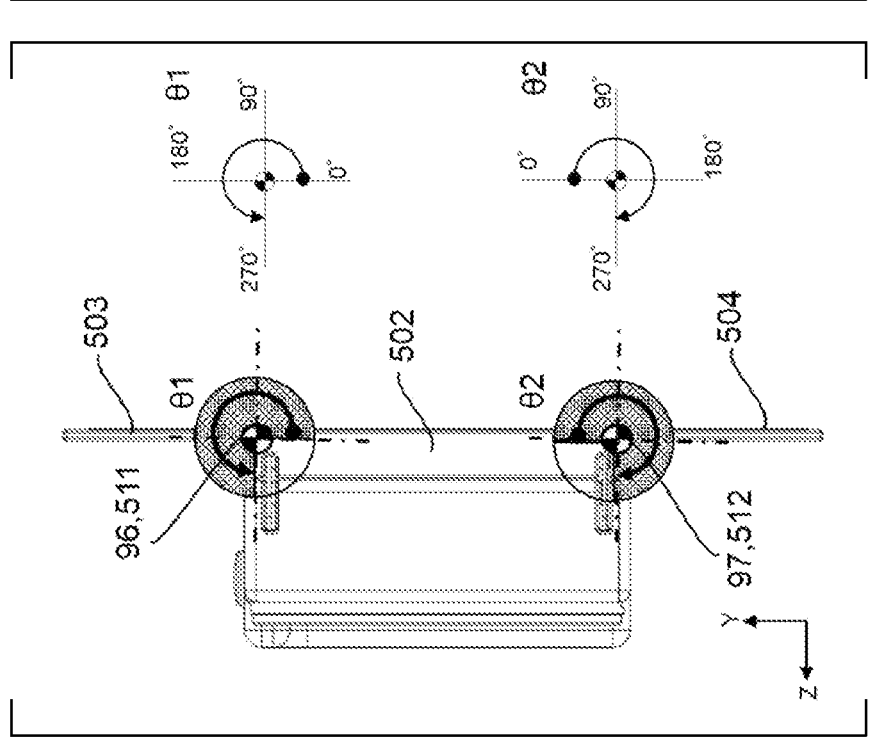

Next, a bendable range of the display 200 will be described with reference to FIGS. 5A and 5B. FIG. 5A is a diagram of the display 200 in the unfolded state when seen from the rear surface. FIG. 5B is a diagram of the display 200 in the unfolded state when seen from the side surface.

In FIGS. 5A and 5B, a rotation angle when the first holding member 502 and the second holding member 503 relatively rotate about the axis of the first hinge portion 96 will be referred to as θ1. The angular range of θ1 is as follows.

$$0° \leq \theta 1 \leq 270°$$

A state in which θ1 is 0° is a state in which the first holding member 502 and the second holding member 503 overlap each other in the Z-axis direction in the drawing. It is possible to achieve rotation in the counterclockwise direction around the axis of the first hinge portion 96 from the state in which θ1 is 0° and to transition to a state of 270° in which the first holding member 502 and the second holding member 503 substantially perpendicularly intersect each other. When the first holding member 502 and the second holding member 503 rotate about the axis of the first hinge portion 96 in the counterclockwise direction, the display 200 is bent at the first bending portion 511 as a start point. In other words, the display 200 can be bent within a range of 180° on a predetermined side (inner side) around the axis of the first hinge portion 96 and can be bent within a range of 90° on the opposite side thereof (outer side).

Next, a rotation angle when the first holding member 502 and the third holding member 504 relatively rotate about the axis of the second hinge portion 97 will be referred to as θ2. The angular range of θ2 is as follows.

$$0° \leq \theta 2 \leq 270°$$

A state in which θ2 is 0° is a state in which the first holding member 502 and the third holding member 504 overlap each other in the Z-axis direction in the drawing. It is possible to achieve rotation in the clockwise direction around the axis of the second hinge portion 97 from the state in which θ2 is 0° and to transition to a state of 270° in which the first holding member 502 and the third holding member 504 substantially perpendicularly intersect each other. When the first holding member 502 and the third holding member 504 rotate about the axis of the second hinge portion 97 in the clockwise direction, the display 200 is bent at the second bending portion 512 as a start point. In other words, the display 200 can be bent inward within a range of 180° around the axis of the second hinge portion 97 and can be bent outward within a range of 90°.

Figure 6A:
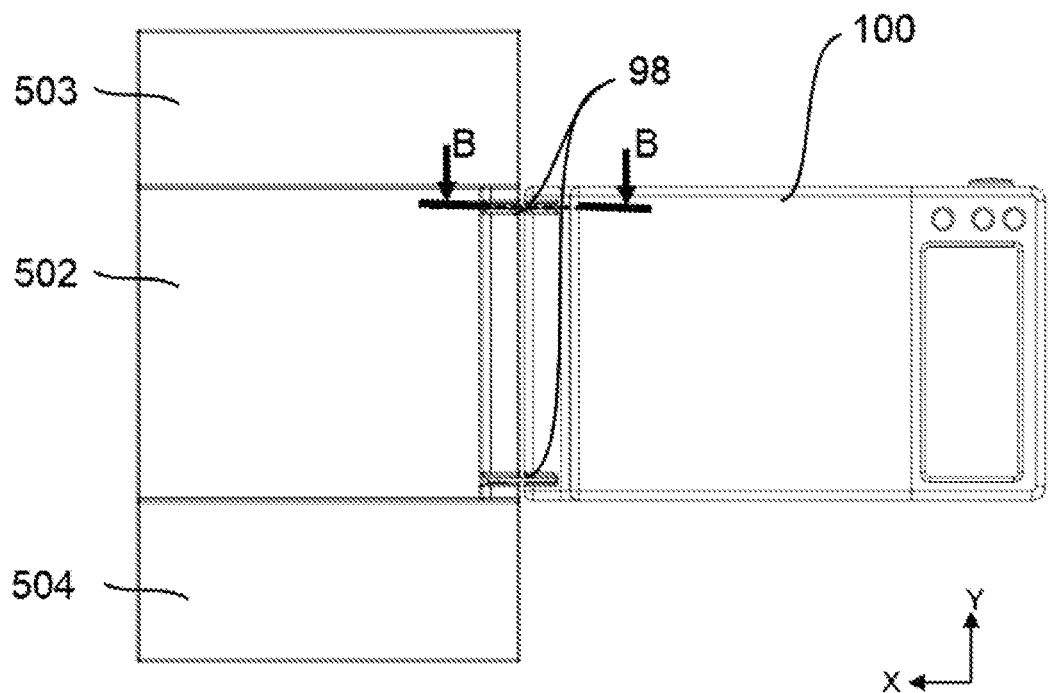
FIGS. 6A and 6B are diagrams illustrating a state of display and a coupling member.
Figure 6B:
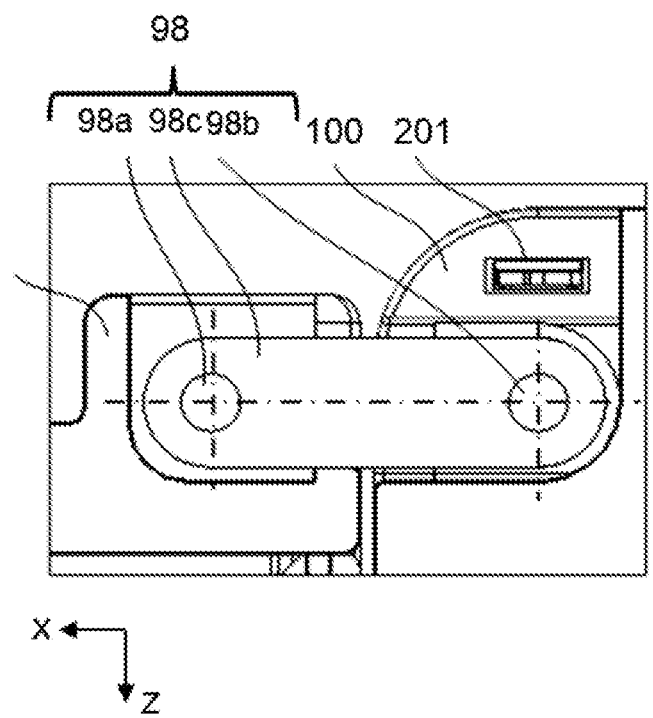

Next, a configuration of the coupling member 98 will be described with reference to FIGS. 6A and 6B. FIG. 6A is an appearance view of a state in which the display 200 has been caused to transition to a position in the lateral direction (the positive direction of the X axis) relative to the main body portion 100 when seen from the rear surface. FIG. 6B is a sectional view illustrating the coupling member 98 along B-B in FIG. 6A.

In FIGS. 6A and 6B, a display-side hinge portion 98a and a main body-side hinge portion 98b constituted by disc springs (not illustrated) and shafts (not illustrated) are provided at the first holding member 502 and the main body portion 100, respectively. This is a so-called biaxial hinge configuration in which the axial centers of the shaft 221 and the biasing portion 220b are connected by a coupling member 98c formed of a sheet metal material or the like. In this manner, a configuration in which the display 200 is rotatable about the Y axis in the drawing around the axes of the display-side hinge portion 98a and the main body-side hinge portion 98b relative to the main body portion 100 is employed. Moreover, a configuration in which the display 200 can be caused to transition to the position in the lateral direction (the positive direction of the X axis in the drawing) relative to the main body portion 100 is employed.

It is possible to employ the same configuration s that of the second hinge portion 97 as described above for the display-side hinge portion 98a and the main body-side hinge portion 98b. It is thus possible to hold the relative positions of the display 200 and the main body portion 100 at desired positions. The detection switch 201 is an angle detection switch constituted of an electronic switch of a substrate mounted type and provided near the coupling member 98 of the main body portion 100. A configuration in which the relative position of the display 200 with respect to the main body portion 100 can be detected by the coupling member 98c rotating about the Y axis in the drawing around the axis of the main body-side hinge portion 98b and a lever, which is not illustrated, of the detection switch 201 being pressed thereinto.

Figure 7:
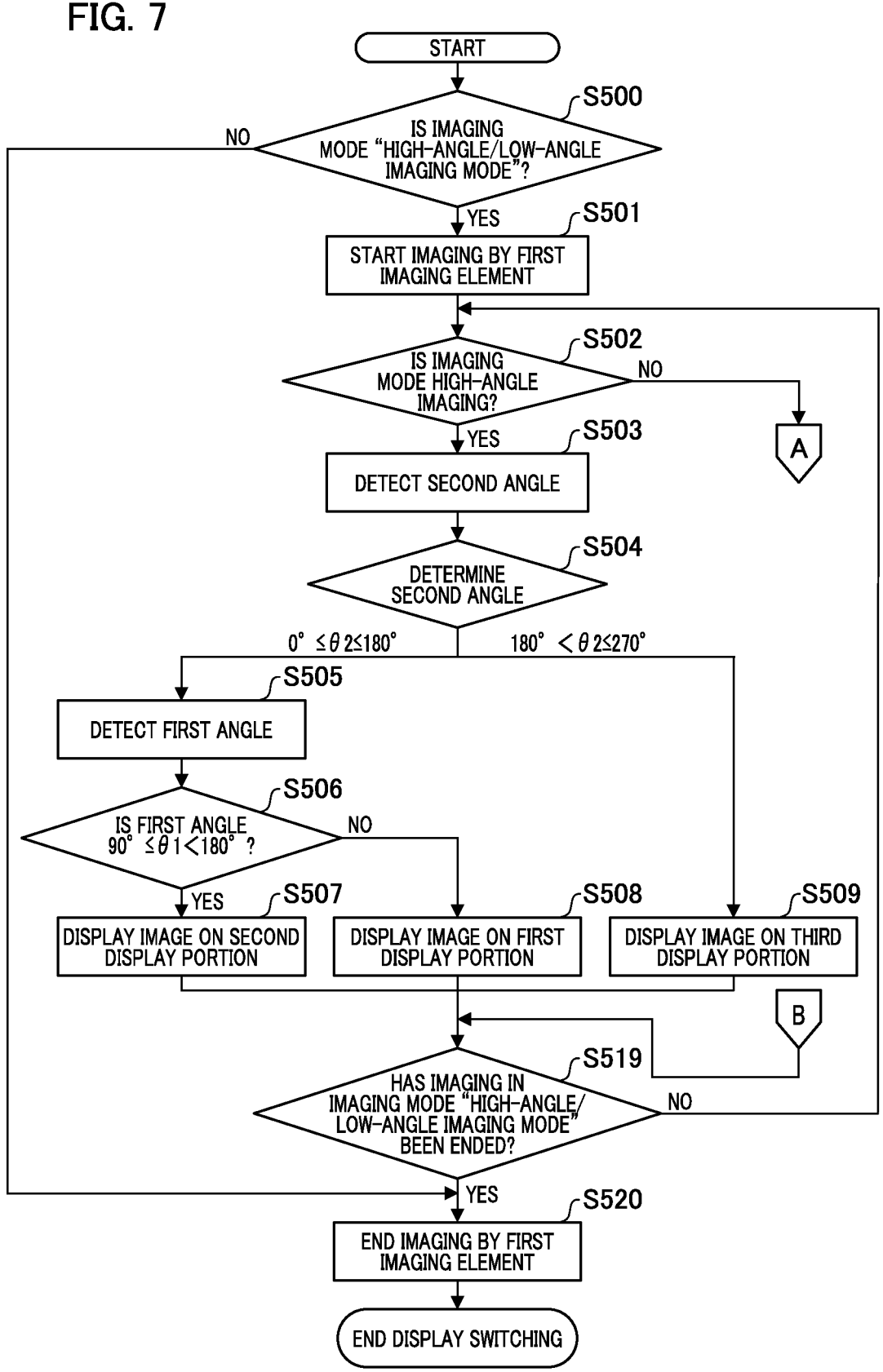
FIG. 7 is a flowchart for explaining display switching control.
Figure 8:
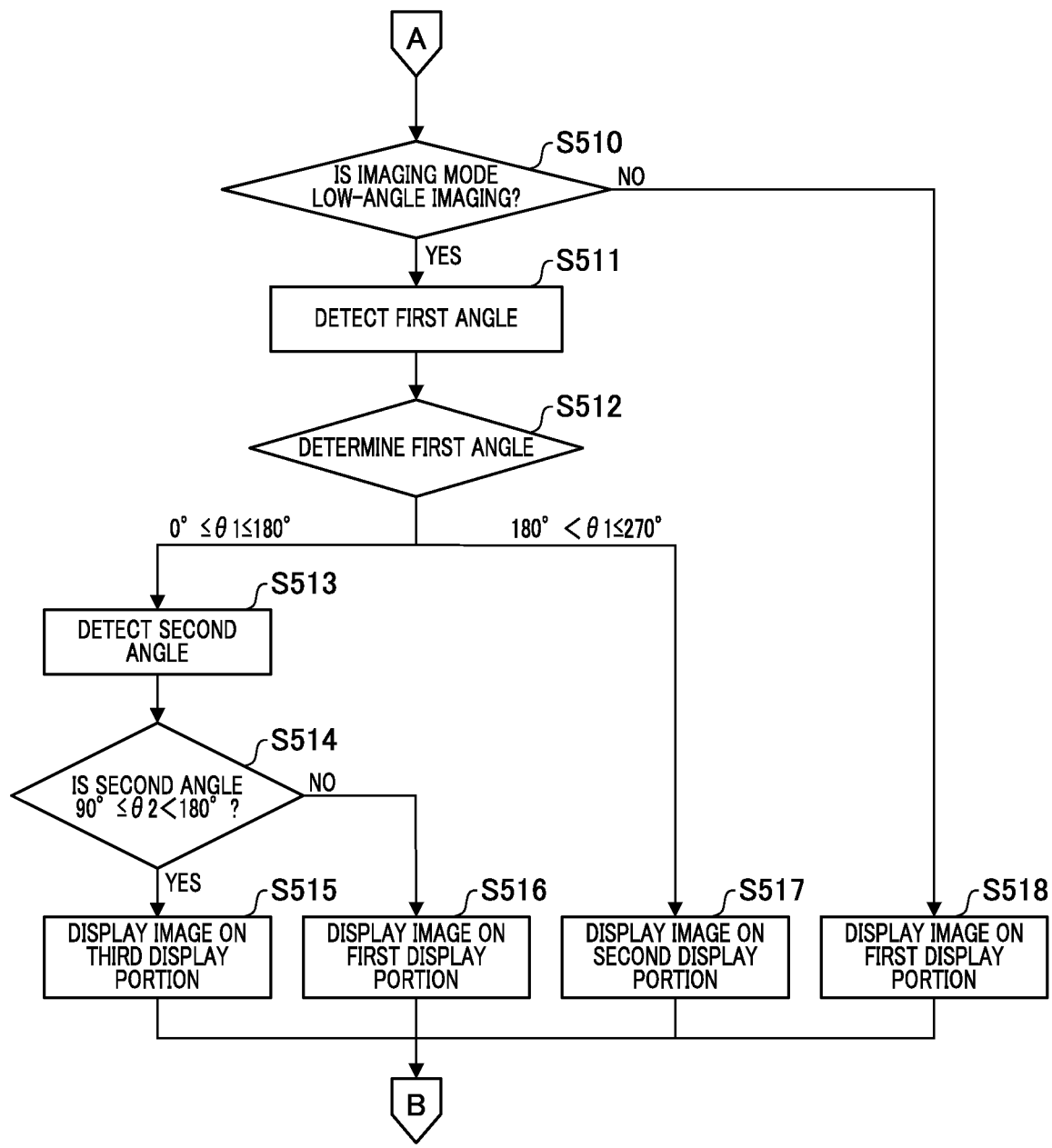
FIG. 8 is a flowchart for explaining the display switching control along with FIG. 7.

Display switching of the display 200 in the camera 10 will be described with reference to FIGS. 7 and 8. FIGS. 7 and 8 are flowcharts for explaining display switching control at the time of high-angle imaging and low-angle imaging of the camera 10. The following processing is realized by the CPU 40 executing a program.

In S500 in FIG. 7, the CPU 40 determines whether an imaging mode that is currently selected is a "high-angle/low-angle imaging mode". In a case in which the imaging mode that is currently selected is determined to be the "high-angle/low-angle imaging mode" (Yes in S500), the processing proceeds to S501. In a case in which the imaging mode that is selected is determined not to be the "high-angle/low-angle imaging mode" (No in S500), the processing proceeds to S520.

In S501, the first imaging element 71 starts imaging. Next, the CPU 40 determines whether or not the camera 10 is performing the high-angle imaging (S502). In a case in which the camera 10 is determined to be performing the high-angle imaging (Yes in S502), the processing proceeds to S503. In a case in which the camera 10 is determined not to be performing the high-angle imaging (No in S502), the processing proceeds to S510 in FIG. 8.

In S503, the CPU 40 performs processing in which the axis-two rotation angle detection sensor 532 detects the rotation angle θ2 of the second hinge portion 97. In S504, processing of determining the rotation angle θ2 is executed. The condition range of the determination of the rotation angle θ2 is "180°<θ2≤270°". In a case in which the condition is satisfied, the processing proceeds to S509. In a case in which the condition is not satisfied, that is, in a case in which "0°<θ2≤180°", the processing proceeds to S505. In S509, the CPU 40 performs processing of display an image acquired by the first imaging element 71 on the third display portion 500c. Then, the processing proceeds to S519.

In S505, the CPU 40 performs processing in which the axis-one rotation angle detection sensor 531 detects the rotation angle θ1 of the first hinge portion 96. In S506, processing of determining the rotation angle θ1 is executed. The condition range of the determination of the rotation angle θ1 is "90°≤θ1<180°". In a case in which the condition is satisfied, the processing proceeds to S507. In a case in which the condition is not satisfied, that is, in a case of s rotation angle outside the range of "90°≤θ1<180°", the processing proceeds to S508.

In S507, the CPU 40 performs processing of displaying an image acquired by the first imaging element 71 on the second display portion 500b. Also, in S508, the CPU 40 performs processing of displaying an image acquired by the first imaging element 71 on the first display portion 500a. After S507 and S508, the processing proceeds to S519.

In S510 in FIG. 8, the CPU 40 determines whether or not the camera 10 is performing the low-angle imaging. In a case in which the camera 10 is determined to be performing the low-angle imaging (Yes in S510), the processing proceeds to S511. In a case in which the camera 10 is determined not to be performing the low-angle imaging (No in S510), the processing proceeds to S518.

In S511, the CPU 40 performs processing in which the axis-one rotation angle detection sensor 531 detects the rotation angle θ1 of the first hinge portion 96. In S512, processing of determining the rotation angle θ1 is executed. The condition range of the determination of the rotation angle θ1 is "180°<θ1≤270°". In a case in which the condition is satisfied, the processing proceeds to S517. In a case in which the condition is not satisfied, that is, in a case in which "0°≤θ1≤180°", the processing proceeds to S513.

In S517, the CPU 40 performs processing of displaying an image acquired by the first imaging element 71 on the second display portion 500b. Next, the processing proceeds to S519 in FIG. 7. In S513, the CPU 40 performs processing in which the axis-two rotation angle detection sensor 532 detects the rotation angle θ2 of the second hinge portion 97. In S514, processing of determining the rotation angle θ2 is executed. The condition range of the determination of the rotation angle θ2 is "90°≤θ2<180°". In a case in which the condition is satisfied, the processing proceeds to S515. In a case in which the condition is not satisfied, the processing proceeds to S516.

In S515, the CPU 40 performs processing of displaying an image acquired by the first imaging element 71 on the third display portion 500c. In S516, the CPU 40 performs processing of displaying an image acquired by the first imaging element 71 on the first display portion 500a. After S515 and S516, the processing proceeds to S519 in FIG. 7. In S518, the CPU 40 performs processing of displaying an image acquired by the first imaging element 71 on the first display portion 500a. Next, the processing proceeds to S519 in FIG. 7.

In S519 in FIG. 7, the CPU 40 determines whether the "high-angle/low-angle imaging mode" has been ended. In a case in which the "high-angle/low-angle imaging mode" is determined not to have been ended (No in S519), the processing proceeds to S502. In a case in which the "high-angle/low-angle imaging mode" is determined to have been ended (Yes in S519), the processing proceeds to S520. In S520, the first imaging element 71 ends the acquisition of the images, and the display switching processing is ended.

Figure 9:
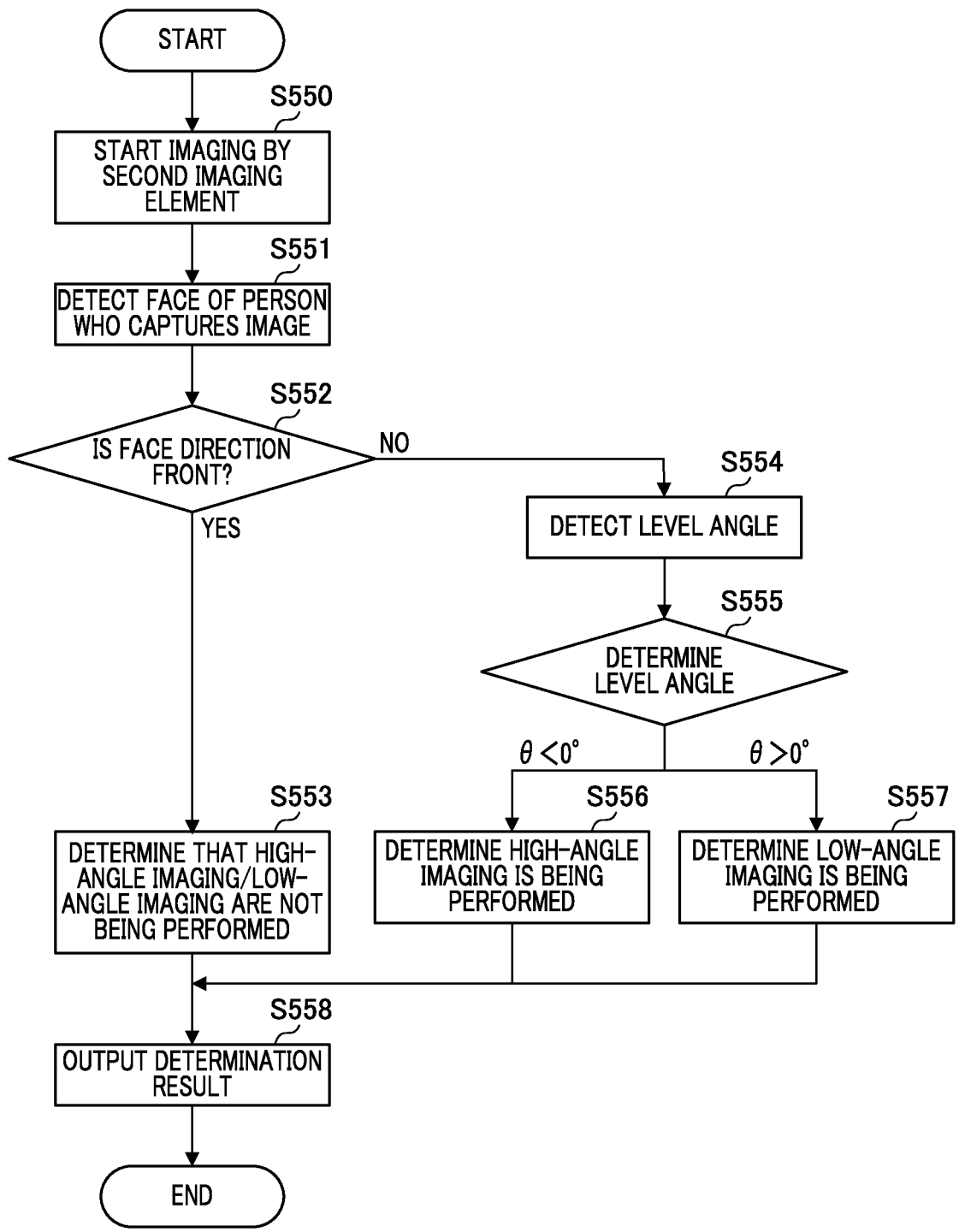
FIG. 9 is a flowchart for explaining high-angle imaging/low-angle imaging determination processing.

Next, processing of determining the high-angle/low-angle imaging of the camera 10 will be described with reference to FIG. 9. FIG. 9 is a flowchart for explaining the processing of determining the high-angle imaging and the low-angle imaging.

In S550, the second imaging element 571 disposed on the first display portion 500a starts to acquire an image. In following S551, the CPU 40 performs processing of detecting a face of a person who captures the image from the image acquired in S550. In S552, the CPU 40 determines whether or not the person who captures the image is in front of the second imaging element 571 on the basis of the direction of the face of the person who captures the image. In a case in which the person who captures the image is determined to face the front surface of the second imaging element 571 (Yes in S552), the processing proceeds to S553. In a case in which the person who captures the image is determined not to face the front surface of the second imaging element 571 (No in S552), the processing proceeds to S554. In S553, the CPU 40 determines that the camera 10 has not performed the high-angle imaging and the low-angle imaging. Next, the processing proceeds to S558.

In S554, the CPU 40 performs processing of detecting the angle of the level 568. In following S555, the CPU 40 determines the angle (referred to as θ) output by the level 568. The condition range of the determination of the angle θ is "θ<0°". In a case in which "θ<0°" is determined to be satisfied, the processing proceeds to S556. In a case in which "θ>0°" is determined to be satisfied, the processing proceeds to S557.

In S556, the CPU 40 determines that the camera 10 is performing the high-angle imaging. In S557, the CPU 40 determines that the camera 10 is performing the low-angle imaging. After S556 and S557, the processing proceeds to S558. In S558, the CPU 40 outputs any of the determination results in S553, S556, and S557 and completes the processing.

In the related art, there is a probability that the electronic apparatus may increase in size in a case in which a rotation mechanism and an actuator for operating the display device, for example, are included. If it takes time to change the posture of the display device, it may cause degradation of visibility of a display screen. According to the present embodiment, it is possible to display a captured image to face the person who captures the image at the time of the high-angle imaging and the low-angle imaging without causing the display device to operate at the time of the imaging. It is thus possible to provide an imaging apparatus capable of further improving visibility.

Second Embodiment

Next, an electronic apparatus according to a second embodiment of the present invention will be described with reference to FIG. 10. For simple explanation, only parts with different configurations from those in the first embodiment will be described. Such a method of omitting explanation will also similarly be applied to the following embodiments.

Figure 10:
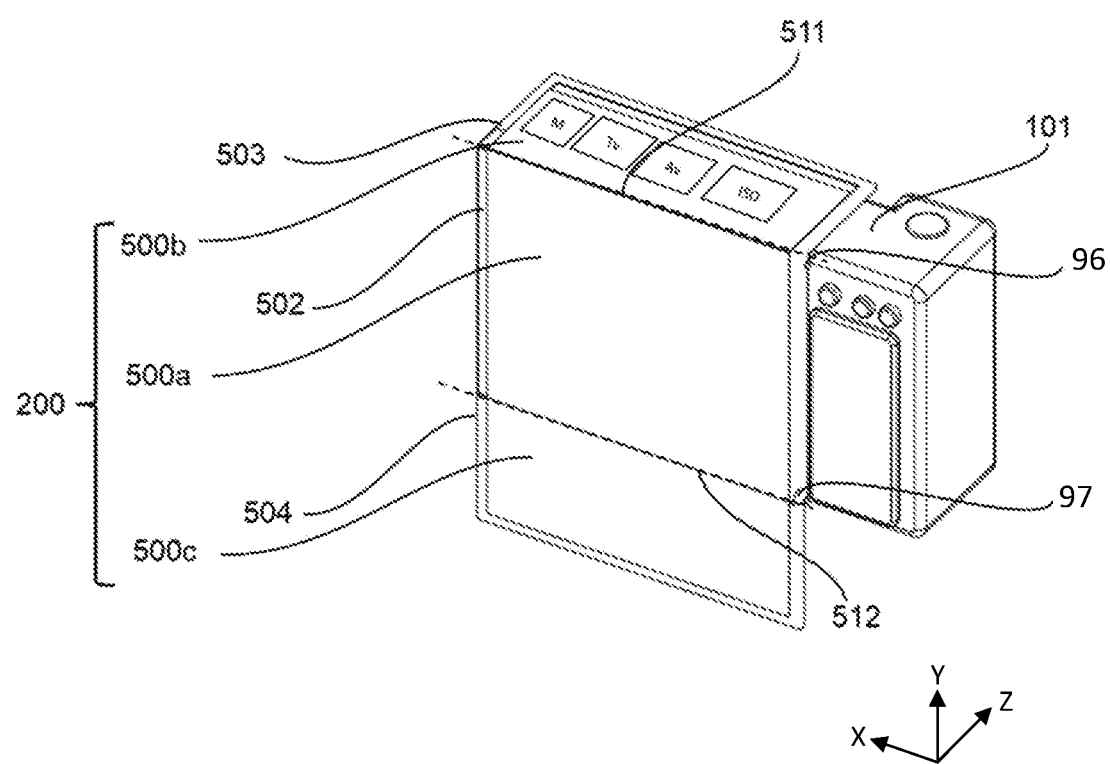
FIG. 10 is an appearance perspective view illustrating an electronic apparatus according to a second embodiment.

FIG. 10 is an appearance perspective view of the display 200 according to the present embodiment when seen from the rear side. In this state, the rotation angle θ1 of the first hinge portion 96 is 270°, and the first display portion 500a and the second display portion 500b are in a perpendicularly intersecting state. An image captured by the first imaging element 71 is not displayed on the second display portion 500b, and a state in which a touch operation function is valid has been achieved. The second display portion 500b displays a shortcut icon for setting imaging condition setting or the like. The shortcut icon for the imaging condition setting or the like is an icon used by the user to perform ISO setting, aperture value setting, exposure time setting, and exposure setting, for example.

Various kinds of information other than the captured image can be displayed on the third display portion 500c similarly to the second display portion 500b, and a state in which the touch operation function is valid has been achieved. It is possible to improve operability at the time of capturing a photo without adding any operation button.

In the present embodiment, display on the second display portion 500b is set to an OFF state (non-displayed state), and the touch operation function is set to an OFF state (non-valid state) when the rotation angle θ1 of the first hinge portion 96 satisfies the condition "θ1<90°". Moreover, display on the third display portion 500c is set to an OFF state, and the touch operation function is set to an OFF state when the rotation angle θ2 of the second hinge portion 97 satisfies the condition "θ2<90°". It is thus possible to prevent erroneous operations.

Third Embodiment

Figure 11A:
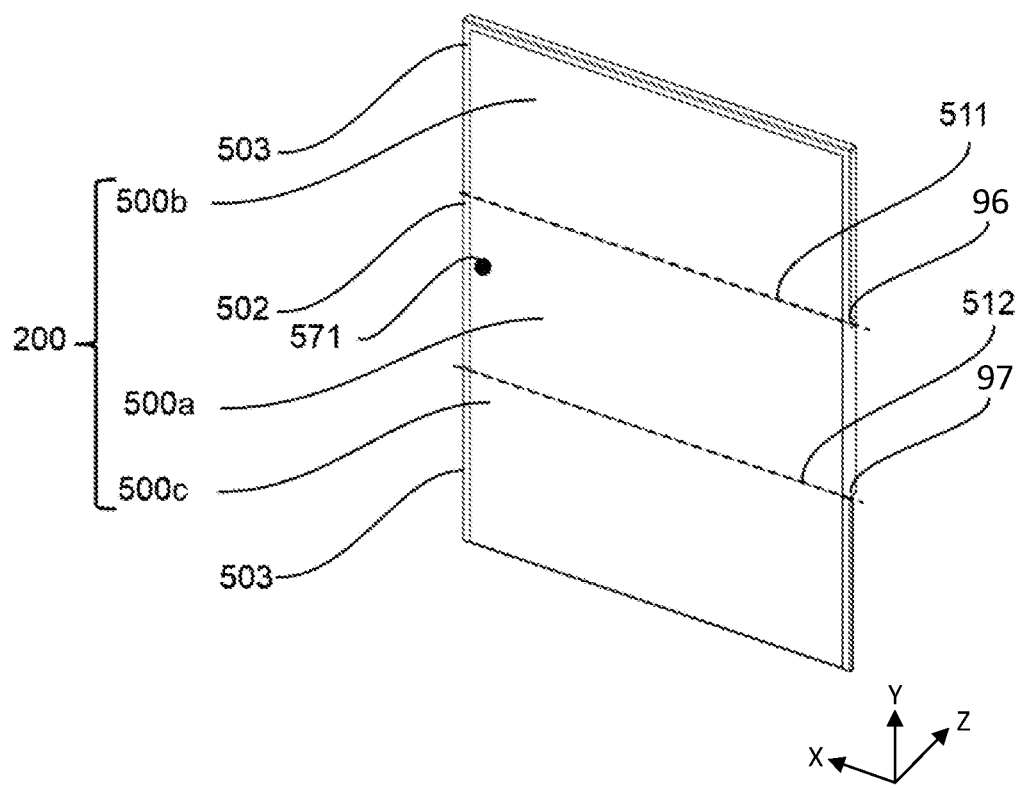
FIGS. 11A and 11B are appearance perspective views illustrating an electronic apparatus according to a third embodiment.
Figure 11B:
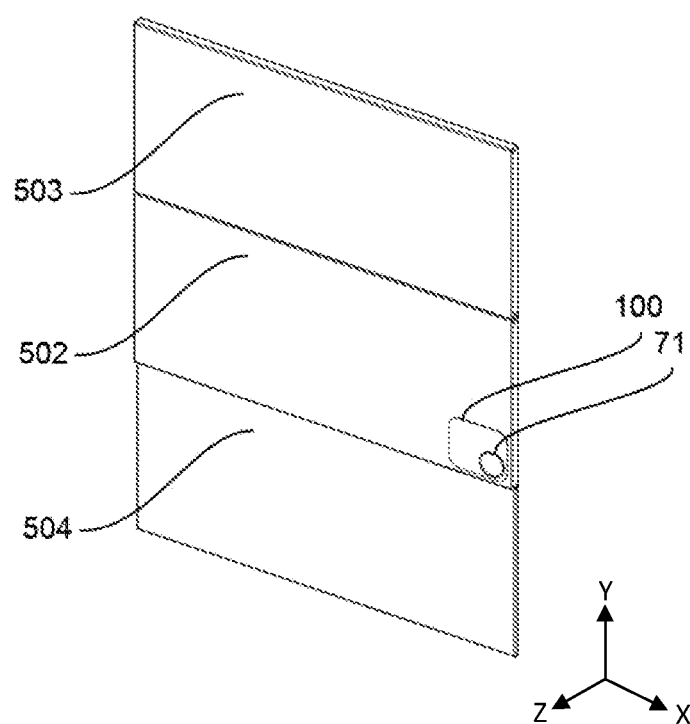

An electronic apparatus according to a third embodiment of the present invention will be described with reference to FIGS. 11A and 11B. FIGS. 11A and 11B illustrate a so-called tablet terminal apparatus in which the main body portion 100 including the first imaging element 71 is small relative to the display 200. The second imaging element 571 is provided on the first display portion 500a. The first imaging element 71 is provided on the first holding member 502. The present embodiment is suitable for size reduction of the apparatus and an improvement in portability.

Fourth Embodiment

Next, a fourth embodiment of the present invention will be described. In the present embodiment, a technique that can provide multiple displays that are not provided with through-holes and enable a relative increase in the displays relative to the main body portion of the electronic apparatus and simultaneous viewing of a plurality of screens without leading to an increase in size of the electronic apparatus will be described.

Figure 12A:
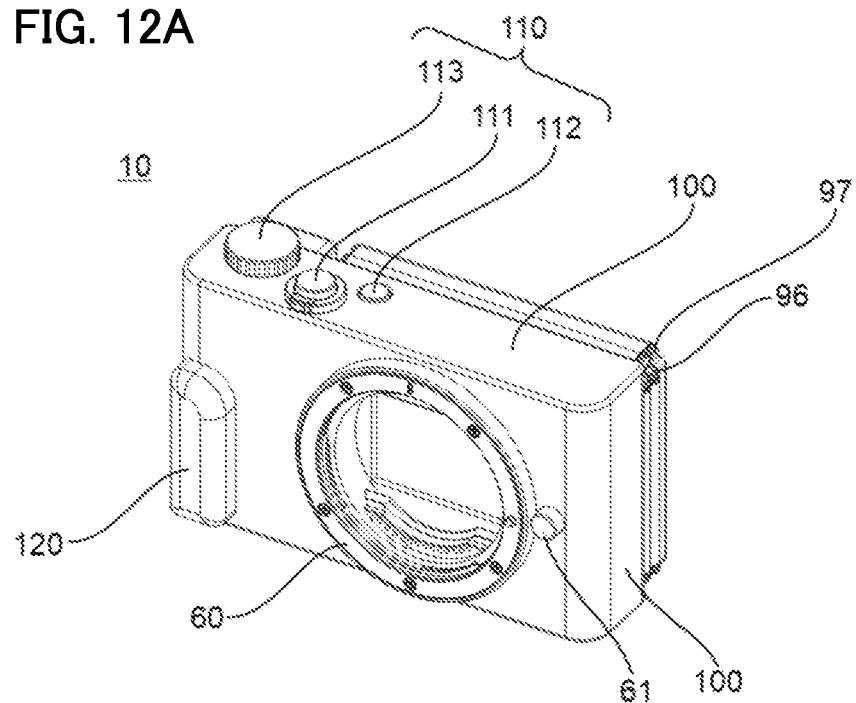
FIGS. 12A and 12B are appearance perspective views illustrating an electronic apparatus according to a fourth embodiment.
Figure 12B:
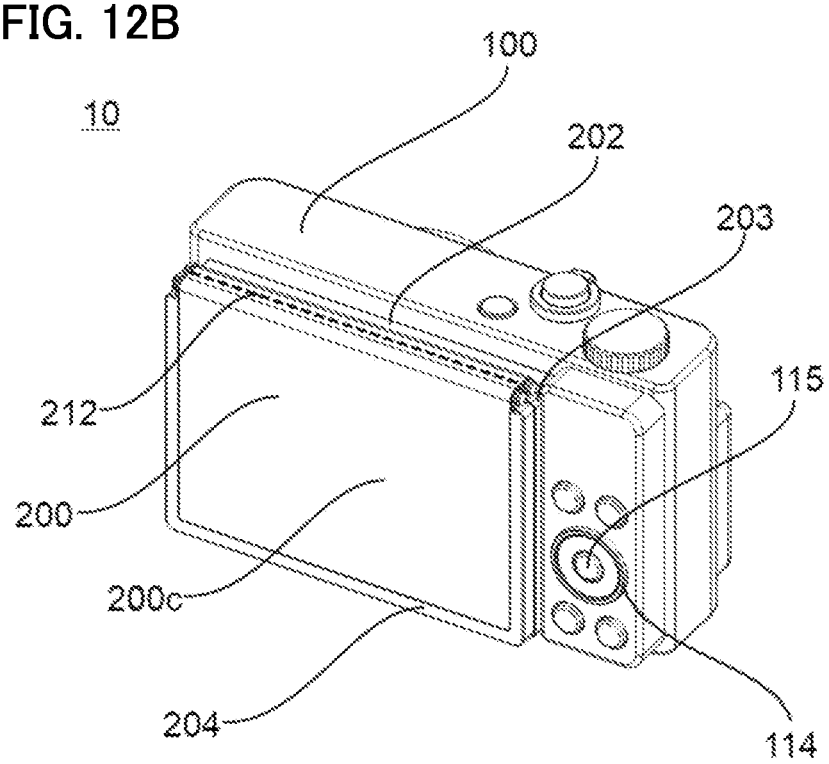
Figure 13:
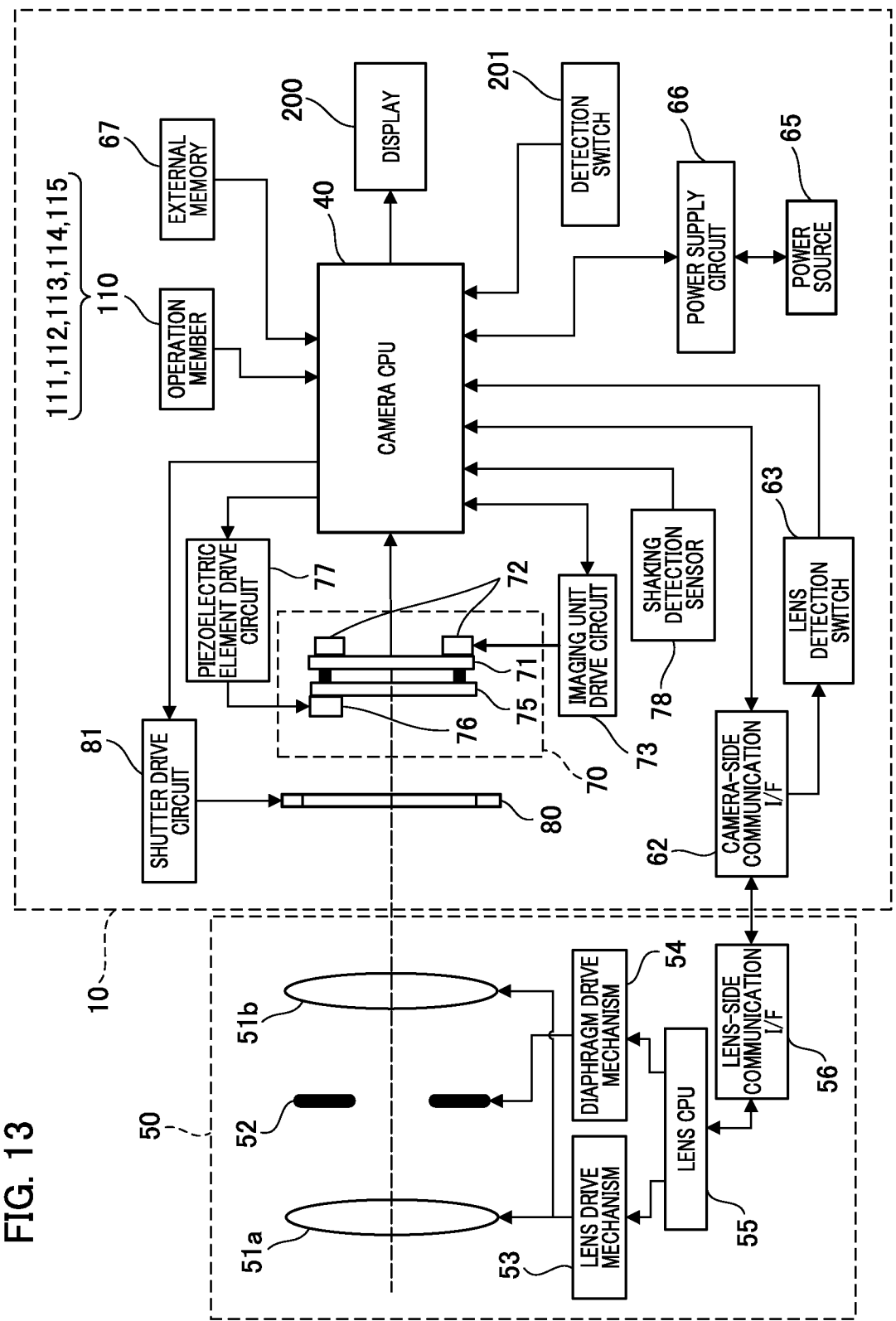
FIG. 13 is a block diagram illustrating a functional configuration according to the fourth embodiment.

FIGS. 12A and 12B are appearance perspective views illustrating a state in which the display 200 of the camera 10 according to the present embodiment is accommodated. FIG. 12A is a front perspective view, and FIG. 12B is a rear perspective view. FIG. 12A illustrates a state in which the lens unit 50 is not attached. FIG. 13 is a block diagram illustrating a functional configuration of the camera 10. An example of a digital camera of a lens exchange type will be illustrated.

The main body portion 100 of the camera 10 includes a grip portion 120 that is a gripping portion used by the user for holding the camera 10. Since the configuration of the lens unit 50 is the same as that in the first embodiment, detailed description will be omitted. The camera 10 and the lens unit 50 are electrically connected to each other via the camera-side communication I/F portion 62 and the lens-side communication I/F portion 56 and can communicate with each other.

The CPU 40 is a control central portion that performs operation control for each component in the camera 10. The power source 65 that supplies power to each component in the camera 10 and the power supply circuit 66 are the same as those in the first embodiment. The shutter 80 performs incidence control of an imaging light flux by exposing and blocking the imaging element 71. The shutter curtain (not illustrated) of the shutter 80 is caused to perform opening and closing operations by the shutter drive circuit 81. The imaging element 71 takes the imaging light flux from the lens unit 50 and performs photoelectric conversion. In the present embodiment, one imaging element 71 is included, and no second imaging element 571 is included.

The optical low-pass filter 75 on the front surface of the imaging element 71, the piezoelectric element 76, and the piezoelectric element drive circuit 77 are the same as those in the first embodiment. In the present embodiment, the shaking detection sensor 78 is included, and no level 568 is included.

The display 200 that has the touch operation function is provided on the rear surface of the camera 10, at least partially has flexibility, and has a bendable configuration. Details of the configuration of the display 200 will be described later.

The display 200 is attached to a first holding member 202, a second holding member 203, and a third holding member 204 that are formed through pressing of a sheet metal material or molding of a resin material. The detection switch 201 is constituted by a magnet, a Hall element, and the like, detects the relative positions of the first holding member 202, the second holding member 203, and the third holding member 204, and the main body portion 100, and outputs the detection result to the CPU 40.

The first hinge portion 96 relatively rotatably couples the first holding member 202 and the second holding member 203. The second hinge portion 97 relatively rotatably couples the second holding member 203 and the third holding member 204. Note that details of the configurations of the first hinge portion 96 and the second hinge portion 97 will be described later. Note that the axis-one rotation angle detection sensor 531 and the axis-two rotation angle detection sensor 532 in the first embodiment are not provided in the present embodiment.

Figure 14A:
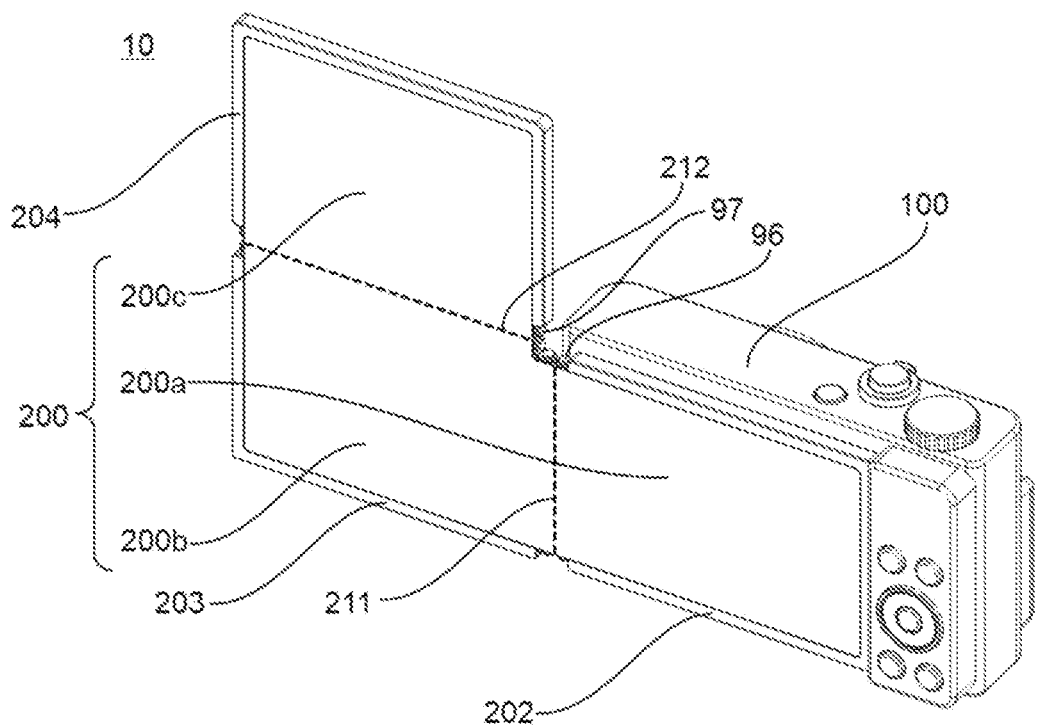
FIGS. 14A and 14B are appearance perspective views illustrating a display fully unfolded state according to the fourth embodiment.
Figure 14B:
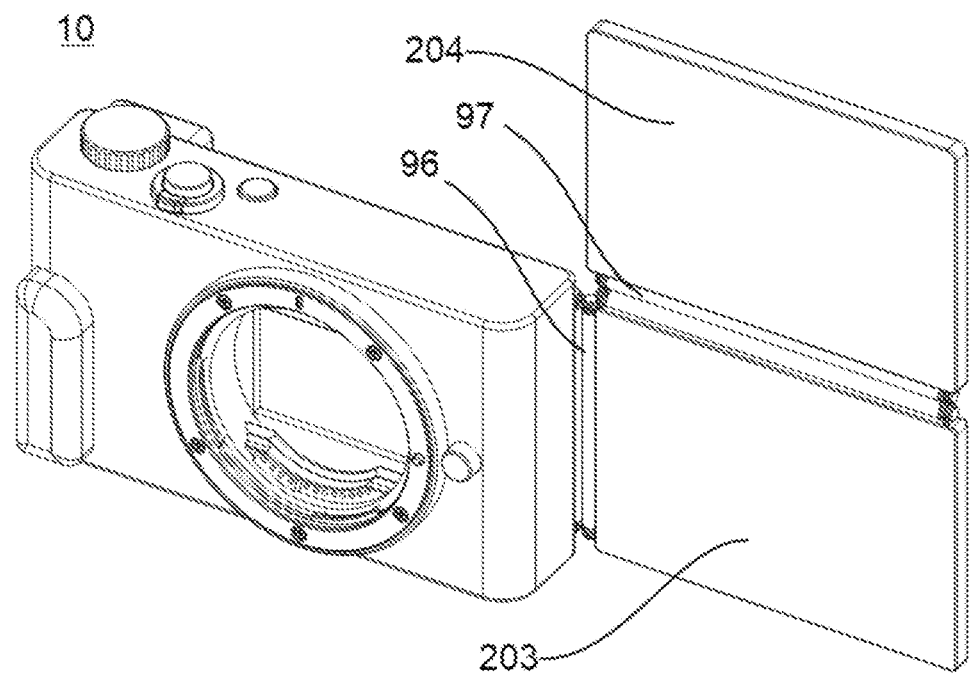
Figure 15A:
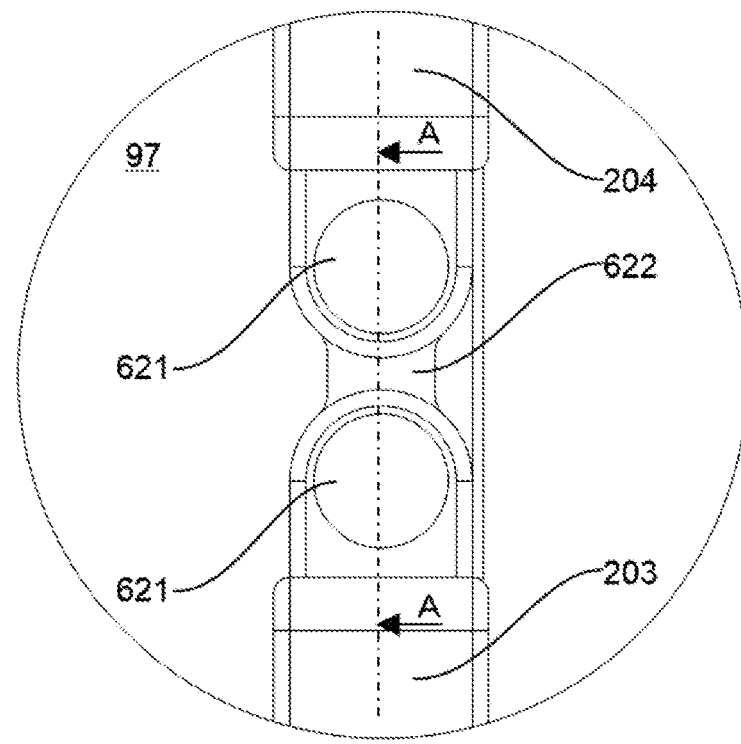
FIGS. 15A and 15B are a detailed view and a sectional view of a hinge portion according to the fourth embodiment.
Figure 15B:
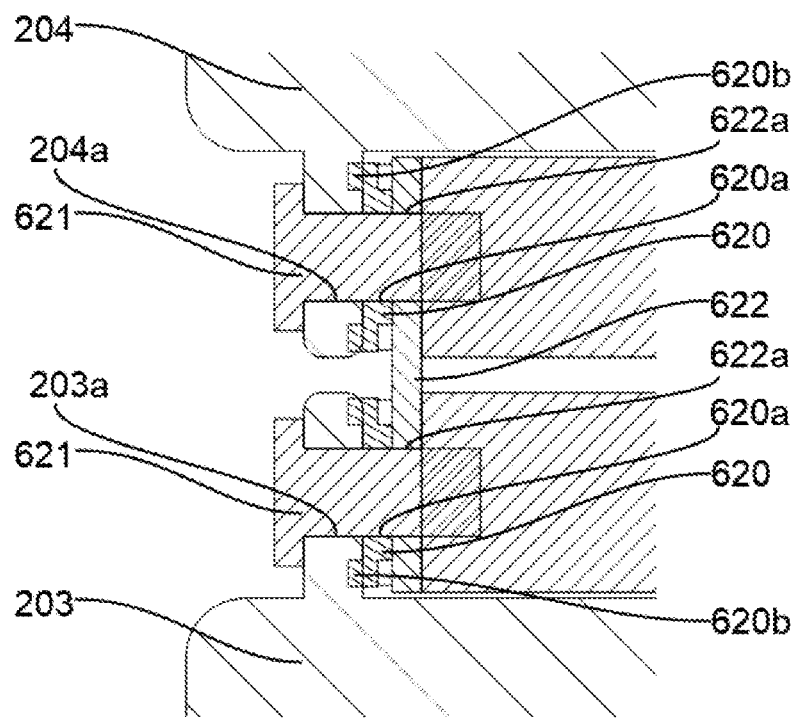

A configuration that enables the display 200 to be bent will be described with reference to FIGS. 14A, 14B, 15A, and 15B. FIGS. 14A and 14B are appearance perspective views illustrating the unfolded state of the display 200. FIG. 14A is a rear perspective view, and FIG. 14B is a front perspective view. FIGS. 15A and 15B is a detailed view and sectional view of a hinge portion of the camera 10.

In FIGS. 14A and 14B, the display 200 is formed of a thin film-shaped material constituted by an organic EL or the like and has an L shape. The display 200 is configured to be bendable at a first bending portion 211 and a second bending portion 212. Also, the display 200 is sectioned into a first display portion 200a, second display portion 200b, and a third display portion 200c virtually split by the first bending portion 211 and the second bending portion 212.

The first holding member 202 holds the position corresponding to the first display portion 200a of the display 200 with a double-sided tape or the like. The second holding member 203 holds the position corresponding to the second display portion 200b of the display 200 with a double-sided tape or the like. The third holding member 204 holds the position corresponding to the third display portion 200c of the display 200 with a double-sided tape or the like. The first holding member 202 is secured to the main body portion 100 or is configured integrally with the main body portion 100. It is thus possible to enhance rigidity of the holding members that hold the display 200 and realize display of a display screen that is less likely to shake and provides satisfactory visual quality.

Although the configuration in which the display 200 is attached to and held by the first holding member 202, the second holding member 203, and the third holding member 204 with the double-sided tapes or the like is employed in the present embodiment, other known techniques may be used. For example, there is a configuration in which the front and back sides of the display 200 in the thickness direction (the Z-axis direction in the drawing) are held in a pinched manner into groove shape portions provided in the first holding member 202, the second holding member 203, and the third holding member 204.

The first hinge portion 96 rotatably couples the first holding member 202 to the second holding member 203. The first hinge portion 96 has a so-called biaxial configuration that couples two monoaxial hinges. The first hinge portion 96 is disposed near the first bending portion 211 on the rear side of the display 200.

The second hinge portion 97 rotatably couples the second holding member 203 to the third holding member 204. The second hinge portion 97 has a so-called biaxial configuration that couples two monoaxial hinges. The second hinge portion 97 is disposed near the second bending portion 212 on the rear side of the display 200.

In FIG. 14A, the second display portion 200b is located on the left side of the first display portion 200a, and the third display portion 200c is located on the upper side of the second display portion 200b. The first bending portion 211 and the second bending portion 212 do not intersect each other and are configured to substantially perpendicularly intersect each other on extended lines thereof. In other words, the display 200 has an L shape.

A configuration in which the second display portion 200b is located on the upper side of the first display portion 200a and the third display portion 200c is located on the left side of the second display portion 200b, for example, may be employed as well as the configuration in the present embodiment.

The size of the electronic apparatus does not increase when the display 200 is accommodated as illustrated in FIGS. 12A and 12B by configuring the display 200 to have the L shape. Also, when the display 200 is unfolded as illustrated in FIGS. 14A and 14B, it is possible to provide multiple displays that enables the user to view a plurality of screens at the same time, which provide satisfactory visual quality, and thereby to improve viewability.

Next, a detailed configuration of the second hinge portion 97 will be described with reference to FIGS. 15A and 15B. FIG. 15A is a detailed view of the second hinge portion 97. FIG. 15B is a sectional view of the second hinge portion 97 and illustrates a section along A-A in FIG. 15A.

In FIGS. 15A and 15B, an insertion hole 203a is formed in the second holding member 203. An insertion hole 204a is formed in the third holding member 204. A plurality of disc springs 620 are substantially circular members formed through pressing of a sheet metal material, and insertion holes 620a are formed therein. Also, biasing portions 620b formed to have projecting shapes are provided at a part of outer shapes of the disc springs 620.

A link 622 couples a monoaxial hinge and is a member to obtain a biaxial hinge configuration. The insertion holes 622a are formed in the link 622. A plurality of shafts 621 are formed of metal and have shaft shape portions. A first shaft among the plurality of shafts 621 is inserted into the insertion hole 203a in the second holding member 203, the insertion hole 220a of the disc spring 620, and the insertion hole 622a in the link 622. Similarly, a second shaft is inserted into the insertion hole 204a in the third holding member 204, the insertion hole 220a of the disc spring 620, and the insertion hole 622a in the link 622. The second holding member 203, the disc springs 620, and the link 622 can be held in a pinched manner through cramping at both end portions of the shaft 621. Similarly, the third holding member 204, the disc springs 620, and the link 622 can be held in a pinched manner through cramping at both end portions of the shaft 621. In this manner, a configuration in which the second holding member 203 and the third holding member 204 are rotatable by 360° about a part near the second hinge portion 97 is employed. As illustrated in FIGS. 15A and 15B, a configuration in which a frictional force is caused by pressing the biasing portions 620b against a part of the second holding member 203 and relative positions of the second holding member 203 and the third holding member 204 can be held at desired positions is employed.

In the present embodiment, the first hinge portion 96 employs the same configuration as that of the second hinge portion 97. However, since the first holding member 202 is configured integrally with the main body portion 100, a configuration that is rotatable by about 180 degrees with a stopper, which is not illustrated, is achieved. Although the structure in which the frictional force is caused by the biasing portions 620b with projecting shapes in the disc springs 620 is employed in the present embodiment, other known techniques may be used. For example, there is a configuration in which a notch-shaped recessed portion is provided at a part of the shaft 621, a plate spring is wound around the recessed portion, and the shaft 621 is rotated thereby to cause the frictional force. The second holding member 203 and the third holding member 204 may be coupled to each other with an elastic member such as synthetic rubber.

In the present embodiment, the first bending portion 211 and the second bending portion 212 are provided at substantially the same positions of the first hinge portion 96 and the second hinge portion 97. In this manner, the display 200 is configured to be bent at the first bending portion 211 as a start point when the first holding member 202 and the second holding member 203 relatively rotate about the axis of the first hinge portion 96. Also, the display 200 is configured to be bent at the second bending portion 212 as a start point when the second holding member 203 and the third holding member 204 relatively rotate about the axis of the second hinge portion 97.

As described above, the camera 10 has a configuration that is deformable into a state in which the display 200 is bent and accommodated (the state in FIGS. 12A and 12B, which will be referred to as an accommodated state) and a state in which the display 200 is unfolded (the state in FIGS. 14A and 14B, which will be referred to as an unfolded state).

Figure 16B:
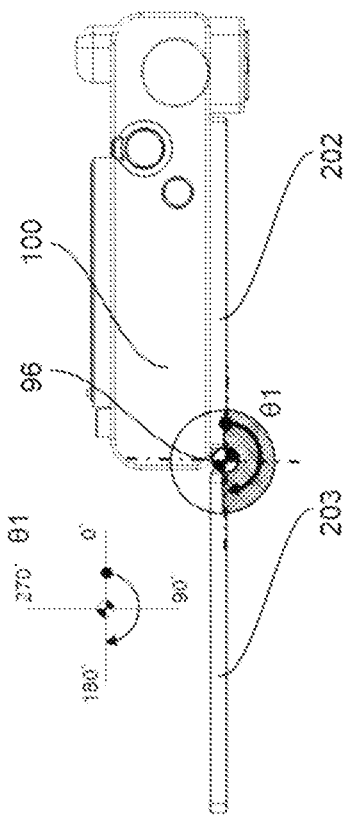
FIGS. 16A to 16C are explanatory diagrams of a display rotatable range according to the fourth embodiment.
Figure 16A:
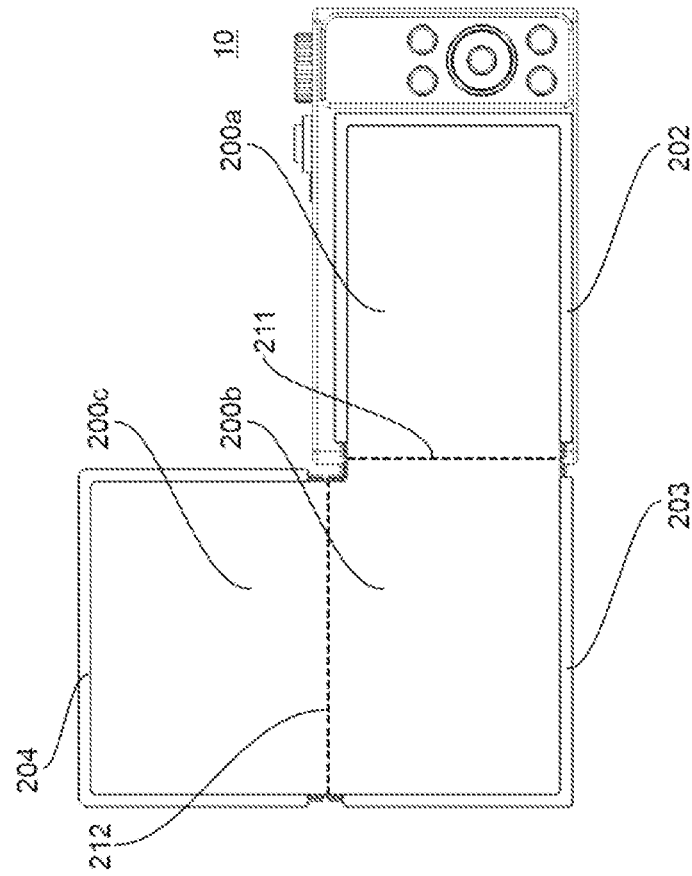
Figure 16C:
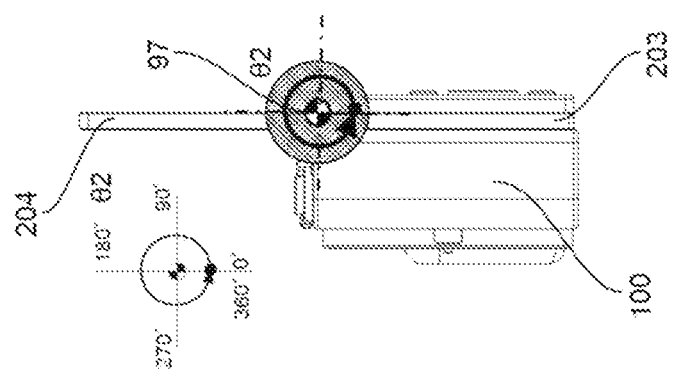

Next, a bendable range of the display 200 will be described with reference to FIGS. 16A to 16C. FIGS. 16A to 16C are appearance views of the camera 10. FIG. 16A is a rear view, FIG. 16B is a top view, and FIG. 16C is a side view.

In FIG. 16B, a rotation angle of the first hinge portion 96 when the second holding member 203 is rotated relative to the first holding member 202 will be referred to as θ1. The range of θ1 is as follows.

$$0° \leq \theta1 \leq 180°$$

As the rotation angle θ1, a state in which the display 200 is bent and closed such that the display surface is located inward is defined as 0°, and the angle in the state in which the display 200 is unfolded is defined as 180°. In other words, in the state in which θ1 is 0°, the display portion 200b can be bent inward by the first hinge portion 96 and can be closed and accommodated such that the display surface thereof faces the display portion 200a. Also, in the state in which θ1 is 180°, the display portion 200b can be brought into an unfolded state such that the display surface is aligned with the display portion 200a side by side.

In FIG. 16C, the rotation angle of the second hinge portion 97 when the third holding member 204 is rotated relative to the second holding member 203 will be referred to as θ2. The range of θ2 is as follows.

$$0° \leq \theta2 \leq 360°$$

As the rotation angle θ2, the angle in a state in which the display 200 is bent and closed such that the display surface is located inward is defined as 0°, and the angle in a state in which the display 200 is unfolded is defined as 180°. Also, the angle in a state of double-side display in which the display surface of the display 200 is bent to be located outward is defined as 360°. In other words, in the state in which θ2 is 0°, the display portion 200c can be bent inward by the second hinge portion 97 and can be closed and accommodated such that the display surface faces the display portion 200b. In the state in which θ2 is 180°, the display portion 200c can be brought into the unfolded state, and the display surface can be aligned with the display portion 200b side by side. In the state in which θ2 is 360°, the display portion 200c is bent outward by the second hinge portion 97 with the display surface directed in the opposite direction, such that double-side display can be performed.

Figure 17A:
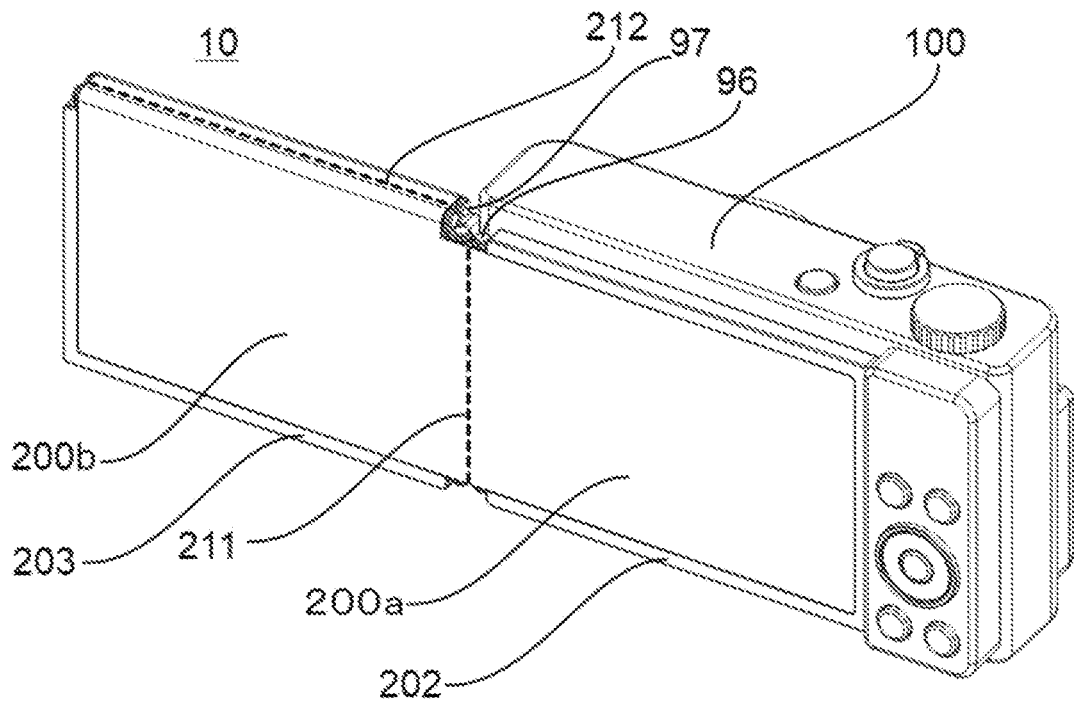
FIGS. 17A and 17B are appearance perspective views illustrating a display lateral half unfolded state according to the fourth embodiment.
Figure 17B:
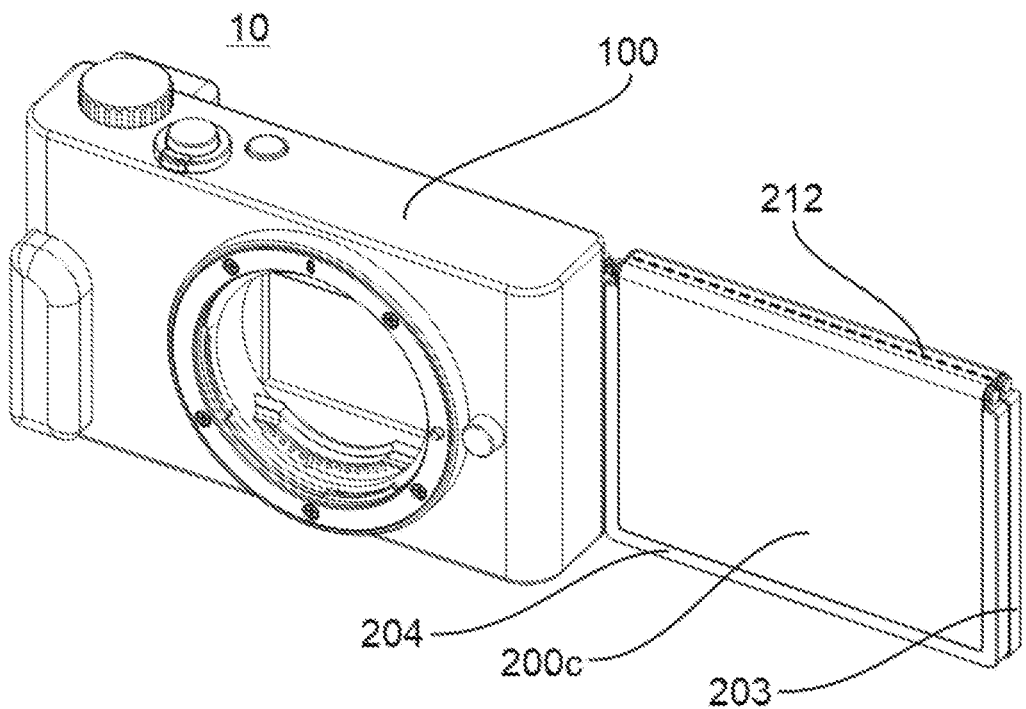

Next, a half-unfolded state of the display 200 will be described with reference to FIGS. 17A, 17B, 18A, and 18B. FIGS. 17A and 17B are appearance perspective views of the display 200 in a lateral-side half-unfolded state. FIG. 17A is a rear perspective view, and FIG. 17B is a front perspective view.

In FIGS. 17A and 17B, an unfolded state in which θ1=180° and a double-side display state in which θ2=360° will be described as rotation angles of the first hinge portion 96 and the second hinge portion 97. One of bending portions is in an unfolded state while the other bending portion is in an outward bending state, that is, the bending portions are in a half-unfolded state. Since the display portions are unfolded on the lateral side of the camera 10, the state will be referred to as a lateral-side half-unfolded state. At this time, the first display portion 200a and the second display portion 200b face the side of the person who captures the image, and the third display portion 200c faces the side of the object. The first display portion 200a and the second display portion 200b enables an increase in size of the display screen and utilization of multiple screens. On the third display portion 200c, it is possible to check the captured image with the display direction changed such that the captured image can be viewed in a normal direction from the object by detecting the outward bent state using the detection switch 201 and vertically inverting the display surface.

Although not illustrated, lateral image angle high-angle imaging can be performed in a state in which θ1=180° and θ2=90° to 180°. In a state in which θ1=180° and θ2=180° to 270°, lateral image angle low-angle imaging can be performed. Similarly, in a state in which θ1=90 to 180° and θ2=360°, vertical image angle high-angle imaging and vertical image angle low-angle imaging can be performed.

In the first bending portion 211, an area with no display appears between the first display portion 200a and the second display portion 200b, that is, at the first bending portion 211 when the first display portion 200a performs independent display. The first bending portion 211 that is the area with no display can be used as a slide touch operation portion by using the touch operation function.

Similarly, in the second bending portion 212, an area with no display appears between the second display portion 200b and the third display portion 200c, that is, at the second bending portion 212 when the third display portion 200c performs independent display. The second bending portion 212 that is the area with no display can be used as a slide touch operation portion by using the touch operation function.

Also, in a case in which the third display portion 200c performs independent display in the accommodated state in FIGS. 12A and 12B, the second bending portion 212 is the area with no display and can thus be used as the slide touch operation portion. Moreover, in a case in which any of the first display portion 200a, the second display portion 200b, and the third display portion 200c performs independent display in the unfolded state in FIGS. 14A and 14B, the first bending portion 211 and the second bending portion 212 are areas with no display. Therefore, it is possible to use the first bending portion 211 and the second bending portion 212 as slide touch operation portions.

In the present embodiment, the display can be checked from both sides, namely the side of the person who captures the image and the side of the object, and the person who captures the image can use the display screen with an increased size and use multiple screens. As a result, it is possible to improve viewability of the user. Also, it is possible to use the bending portions as the slide touch operation portions and thereby to improve operability.

Figure 18A:
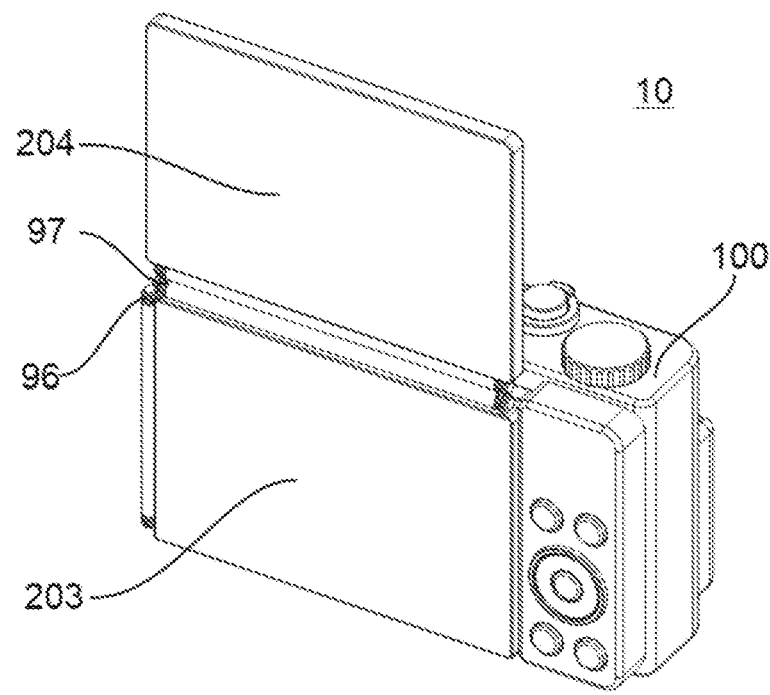
FIGS. 18A and 18B are appearance perspective views illustrating a display upper half unfolded state according to the fourth embodiment.
Figure 18B:
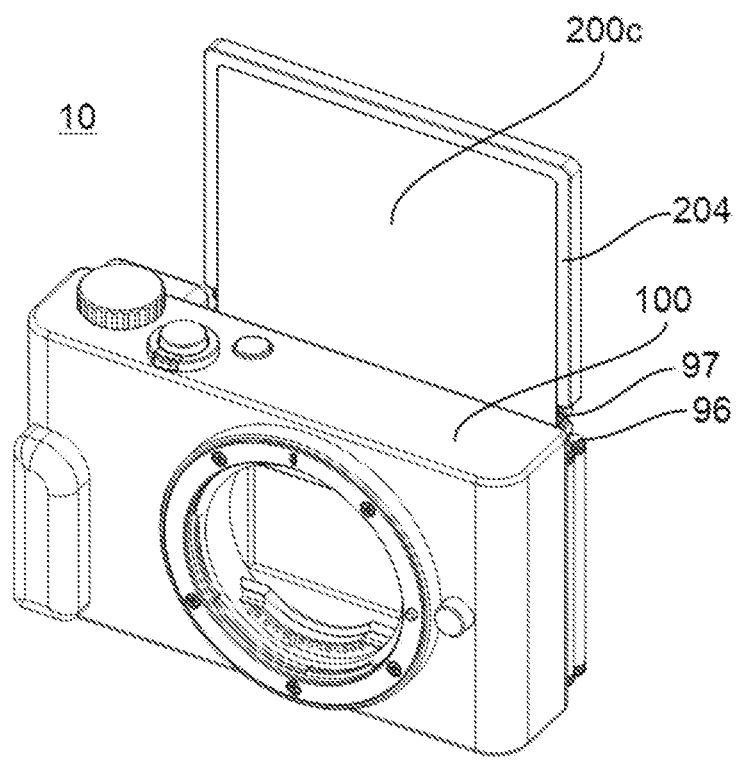

FIGS. 18A and 18B are appearance perspective views of the display 200 in the upper-side half-unfolded state. FIG. 18A is a rear perspective view, and FIG. 18B is a front perspective view. FIGS. 18A and 18B illustrate the inward closed state in which θ1=0° and the unfolded state of θ2=180° as rotation angles of the first hinge portion 96 and the second hinge portion 97. One of the bending portions is in the unfolded state while other bending portion is in the bent state, that is, the bending portions are in the half-unfolded state. Since the display portion is unfolded on the upper side of the camera 10, the state will be referred to as an upper-side half-unfolded state. At this time, the first display portion 200a and the second display portion 200b are closed such that the display surfaces thereof face each other and are thus in a state in which the first display portion 200a and the second display portion 200b are not viewed from both the person who captures the image and the object. Therefore, the display and the touch operation functions of the first display portion 200a and the second display portion 200b are turned off by the detection switch 201 detecting the inward bent state. Since the third display portion 200c faces the side of the object, it is possible to check the captured image from the side of the object.

In the half-unfolded state in FIGS. 17A, 17B, 18A, and 18B, a person who is an object can check the captured image from both the upper side and the lateral side. It is possible to increase options for the user who captures the image and thereby to improve viewability of the user.

Figure 19:
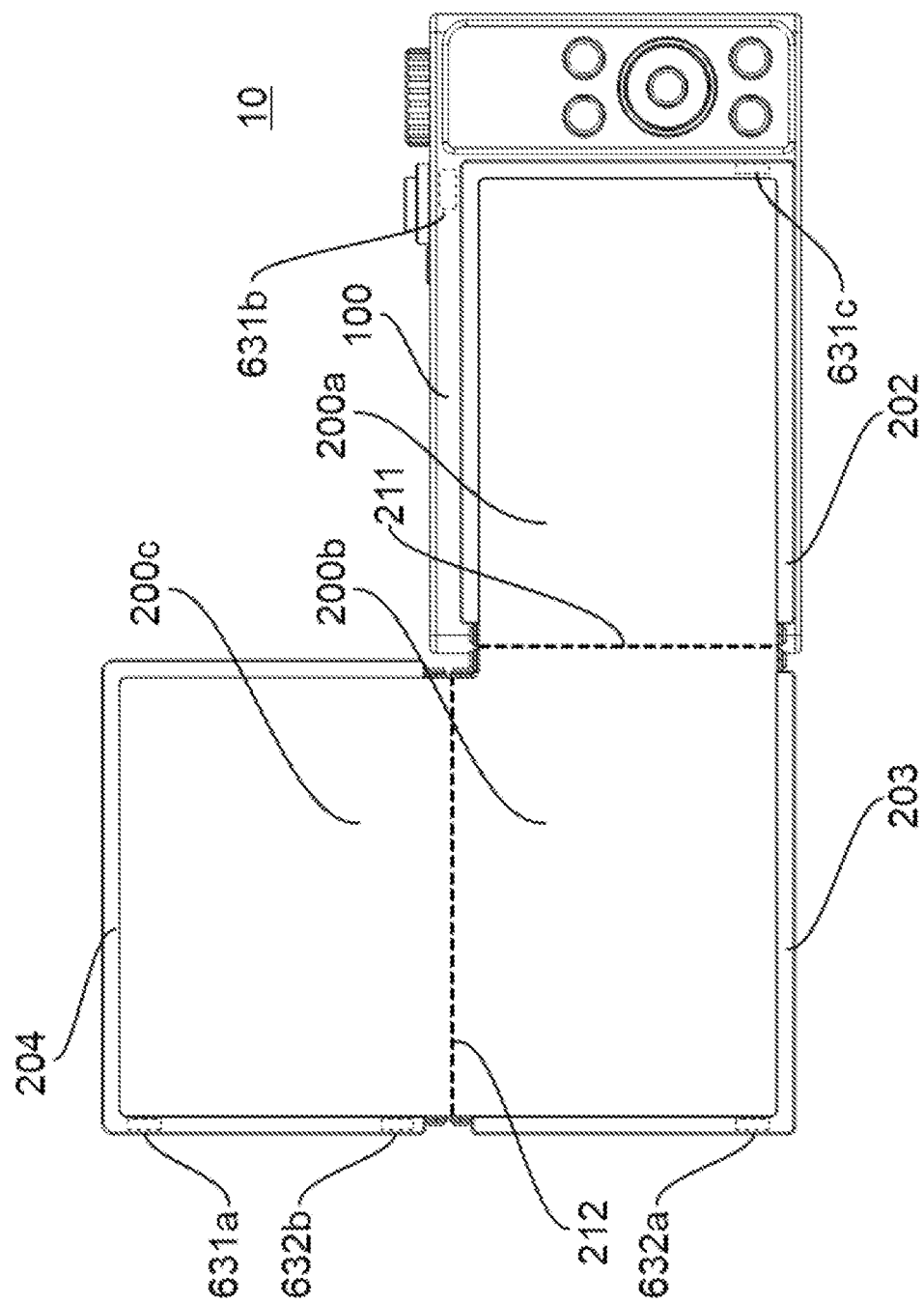
FIG. 19 is a rear view illustrating a layout of a detection switch that detects a state of display.

The detection switch 201 that detects bent and unfolded states of the display 200 will be described with reference to FIG. 19. FIG. 19 is a rear view of the display 200 in an unfolded state. Although various schemes are possible for the detection switch 201, a configuration using a magnetic detection scheme will be described in the present embodiment. The detection switch 201 is constituted by a magnetic detection sensors 631a, 631b, and 631c such as a giant magneto-resistance effect (GMR) sensors and magnets 632a and 632b that cause magnetism. Each magnetic detection sensor and each magnet are disposed as in FIG. 19.

In FIG. 19, the magnetic detection sensor 631a is disposed at upper left of the third holding member 204, and the magnetic detection sensor 631b is disposed inside the main body portion 100 at upper right of the first holding member 202. The magnetic detection sensor 631c is disposed at a lower right of the first holding member 202. The magnet 632a is disposed at a lower left of the second holding member 203. The magnet 632b is disposed at lower left of the third holding member 204.

When the display 200 is bent near the bending portion 211 as a start point from the unfolded state in FIG. 19 into the upper-side half-unfolded state in FIGS. 18A and 18B, the magnetic detection sensor 631b detects magnetism in accordance with approaching of the magnet 632b. Therefore, the CPU 40 can determine the upper-side half-unfolded state in FIGS. 18A and 18B and horizontally invert the image on the third display portion 200c. At this time, the magnetic detection sensor 631c detects magnetism in accordance with approaching of the magnet 632a. Therefore, the CPU 40 can determine the state in which the first display portion 200a and the second display portion 200b face each other and can turn off the display screens and the touch operation functions of the first display portion 200a and the second display portion 200b.

When the display 200 is bent outward near the bending portion 212 as a start point from the unfolded state in FIG. 19 into the lateral-side half-unfolded state in FIGS. 17A and 17B, the magnetic detection sensor 631a detects magnetism in accordance with approaching of the magnet 632a. Therefore, the CPU 40 can determine that the third display portion 200c has been vertically inverted and can vertically invert the display screen on the third display portion 200c. It is possible to similarly hold the vertically inverted state even in the accommodated state in FIGS. 12A and 12B. On the contrary, when the display 200 is bent inward near the bending portion 212 as a start point from the unfolded state in FIG. 19, the magnetic detection sensor 631a detects magnetism in accordance with approaching of the magnet 632a. Therefore, the CPU 40 can determine the state in which the second display portion 200b and the third display portion 200c face each other and can turn off the display screens and the touch operation functions of the second display portion 200b and the third display portion 200c.

As described above, it is possible to prevent erroneous operations by turning off the display screens and the touch operation functions and to improve viewability from the side of the object by inverting the direction of the screen, using the function of the detection switch 201.

Figure 20A:
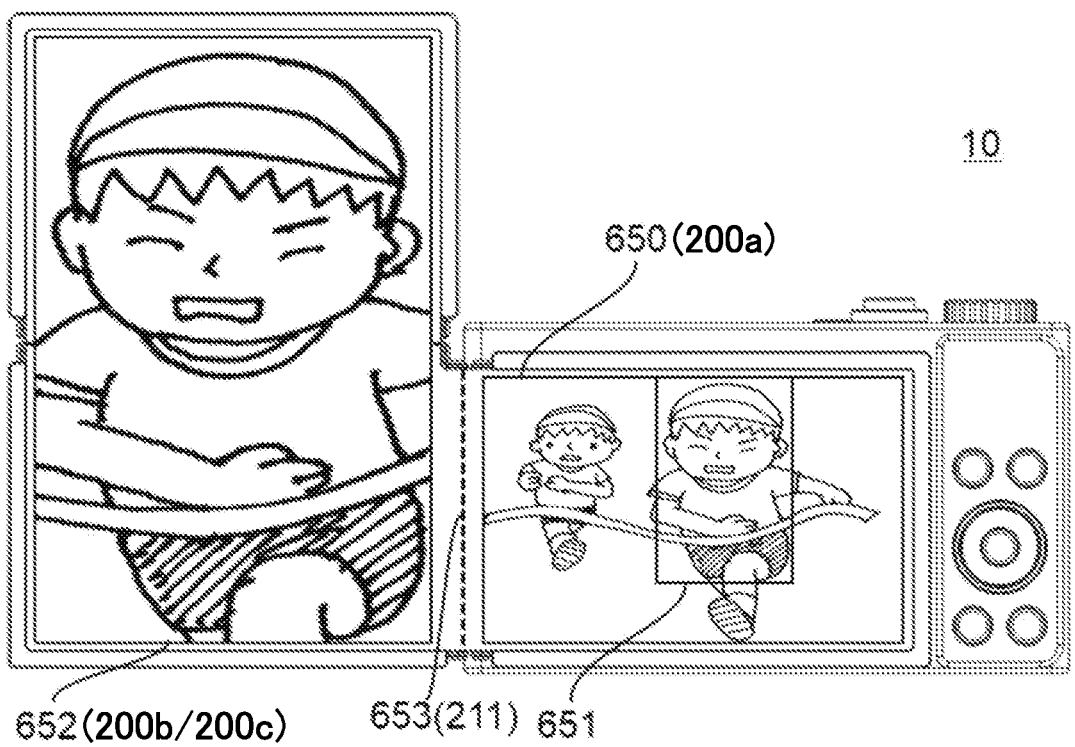
FIGS. 20A and 20B are rear views for explaining a display enlarged display method according to the fourth embodiment.
Figure 20B:
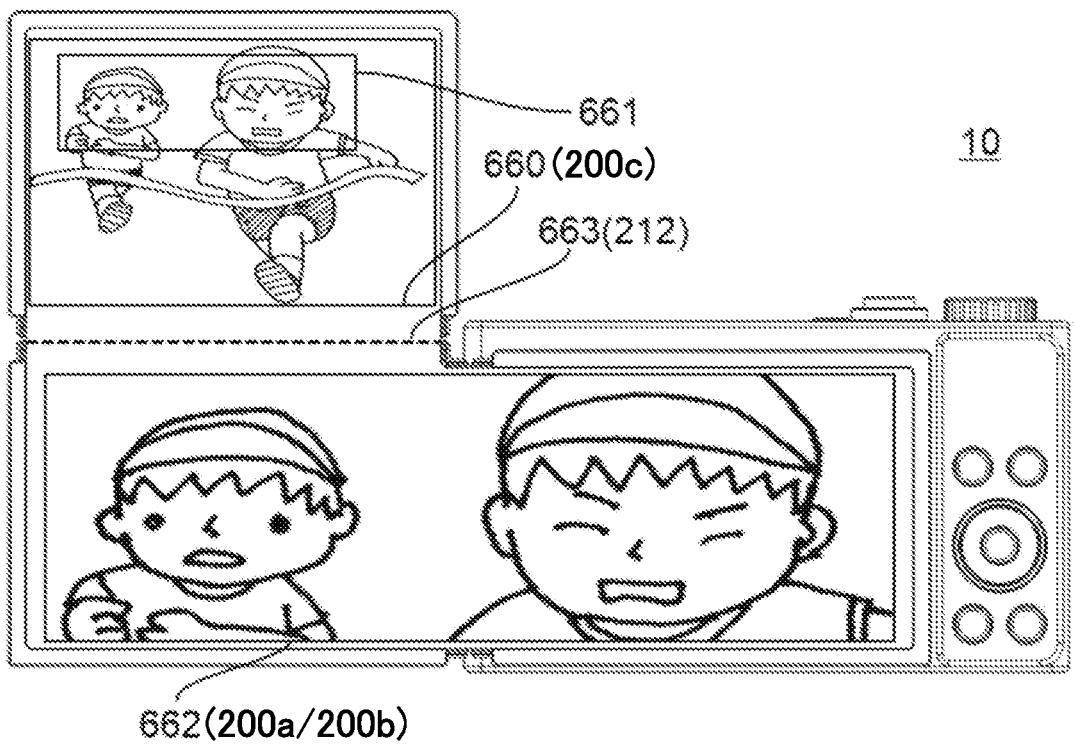

Next, a method of displaying the display 200 in an enlarged manner will be described with reference to FIGS. 20A and 20B. FIGS. 20A and 20B are rear views of the display 200 in the unfolded state. FIG. 20A illustrates a state of vertically-long enlarged display, and FIG. 20B illustrates a state of horizontally-long enlarged display.

In FIG. 20A, the first display portion 200a displays a through-the-lens image 650 that is an object image captured by the imaging element 71. The user can select an area 651 to be displayed in an enlarged manner in the through-the-lens image 650 displayed. The area 651 selected at this time is vertically long. The second display portion 200b and the third display portion 200c can be integrally displayed, and the selected area 651 is displayed here in an enlarged manner. This is the vertically-long enlarged display 652.

Since the bending portion 211 is located between the through-the-lens image 650 and the vertically-long enlarged display 652, it is possible to use the region where no image is displayed as a slide touch operation portion 653. The region can also be used as an enlarging/size-reducing operation region of the selected area 651 and also can be used as an operation region for changing setting parameters of the camera 10. In this manner, the user can perform imaging while checking details of the image that cannot easily be checked in the ordinary display size.

In FIG. 20B, the third display portion 200c displays a through-the-lens image 660 that is the object image captured by the imaging element 71. The user can select an area 661 to be displayed in an enlarged manner in the through-the-lens image 660 displayed. The area 661 selected at this time is horizontally long. The first display portion 200a and the second display portion 200b can perform integral display, and the selected area 661 is displayed here in an enlarged manner. This is the horizontally-long enlarged display 662. Also, since the bending portion 212 is included between the through-the-lens image 660 and the horizontally-long enlarged display 662, it is possible to use the region where no image is displayed as a slide touch operation portion 663. The region can also be used as an enlarging/size-reducing operation region of the selected area 661 and can also be used as an operation region for changing setting parameters of the camera 10. In this manner, the user can perform imaging while checking details of the image that cannot easily be checked in an ordinary display size.

Although the through-the-lens image at the time of capturing the image has been used for the description in FIGS. 20A and 20B, enlarged display can be similarly performed for a captured image at the time of reproduction. The user can check details of the reproduced image on a large screen.

Figure 21:
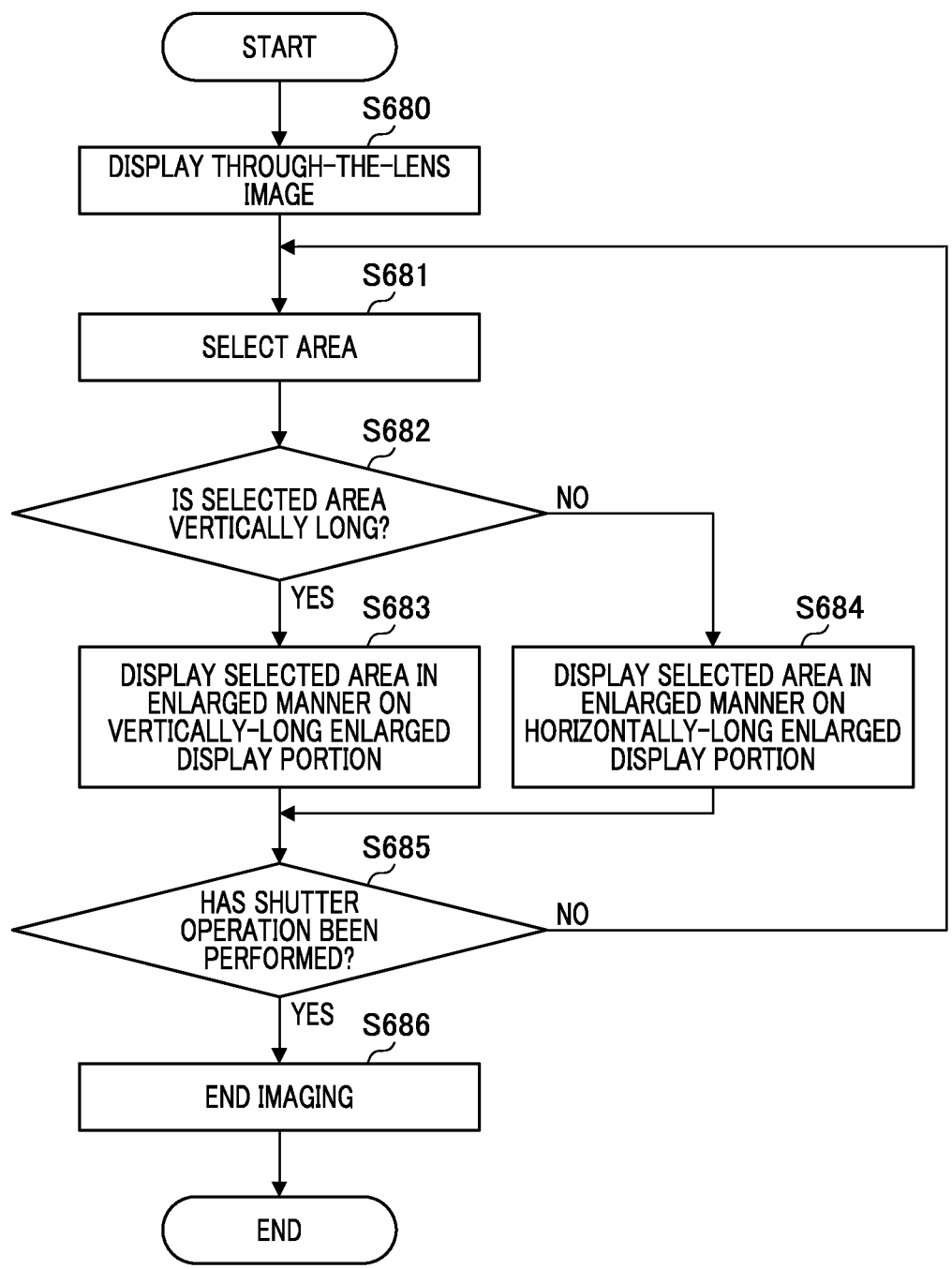
FIG. 21 is a flowchart for explaining vertical-horizontal switching control of display enlarged display according to the fourth embodiment.

Vertical-horizontal switching control of enlarge display of the display 200 will be described with reference to FIG. 21. FIG. 21 is a flowchart illustrating vertical-horizontal switching control of enlarged display of the display 200 at the time of imaging performed by the camera 10. The following processing is realized by the CPU 40 executing a program.

In S680, the CPU 40 performs processing of displaying the through-the-lens image that is the object image captured by the imaging element 71 on the first display portion 200a or the third display portion 200c. Next, processing of selecting an area to be displayed in an enlarged manner from the acquired through-the-lens image is performed (S681). The area selection processing is performed in response to a user's operation instruction.

In S682, the CPU 40 determines whether the selected area acquired in S681 is vertically long. In a case in which the selected area is determined to be vertically long (Yes in S682), the processing proceeds to S683. In a case in which the selected area is determined not to be vertically long (No in S682), the processing proceeds to S684.

In S683, the CPU 40 performs processing of displaying the through-the-lens image on the first display portion 200a as in FIG. 20A and displaying the selected area in an enlarged manner on an integrated vertically-long enlarged display portion constituted by the second display portion 200b and the third display portion 200c.

In S684, the CPU 40 performs processing of displaying the through-the-lens image on the third display portion 200c as in FIG. 20B and displaying the selected area in an enlarged manner on an integrated horizontally-long enlarged display portion constituted by the first display portion 200a and the second display portion 200b. After S683 or S684, the processing proceeds to S685. In S685, the CPU 40 determines whether a shutter operation has been performed. In a case in which the shutter operation is determined to have been performed (Yes in S685), the processing proceeds to S686. In a case in which the shutter operation is determined not to have been performed (No in S685), the processing proceeds to S681. In S686, the imaging is ended, and the vertical-horizontal switching processing of enlarged display is ended.

In the present embodiment, it is possible to present a display screen that can be more efficiently enlarged depending on which of a vertically long area or a horizontally long area the area selected by the user to be enlarged is. It is possible to improve image viewability of the user.

According to the present embodiment, it is possible to relatively increase the size of the display with respect to the apparatus without leading to an increase in size of the apparatus and to realize multiple displays that enables simultaneous viewing of a plurality of screens. Therefore, it is possible to provide the electronic apparatus with improved viewability of the display.

Fifth Embodiment

Figure 22A:
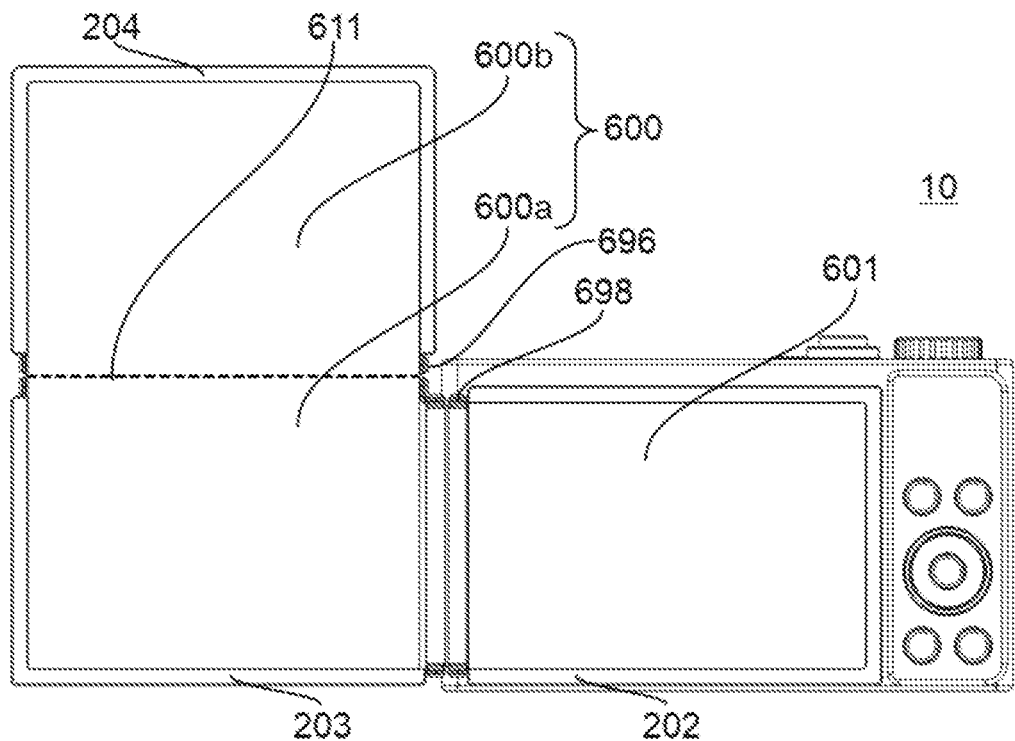
FIGS. 22A and 22B are rear views illustrating an L-shaped configuration including two displays according to a fifth embodiment.
Figure 22B:
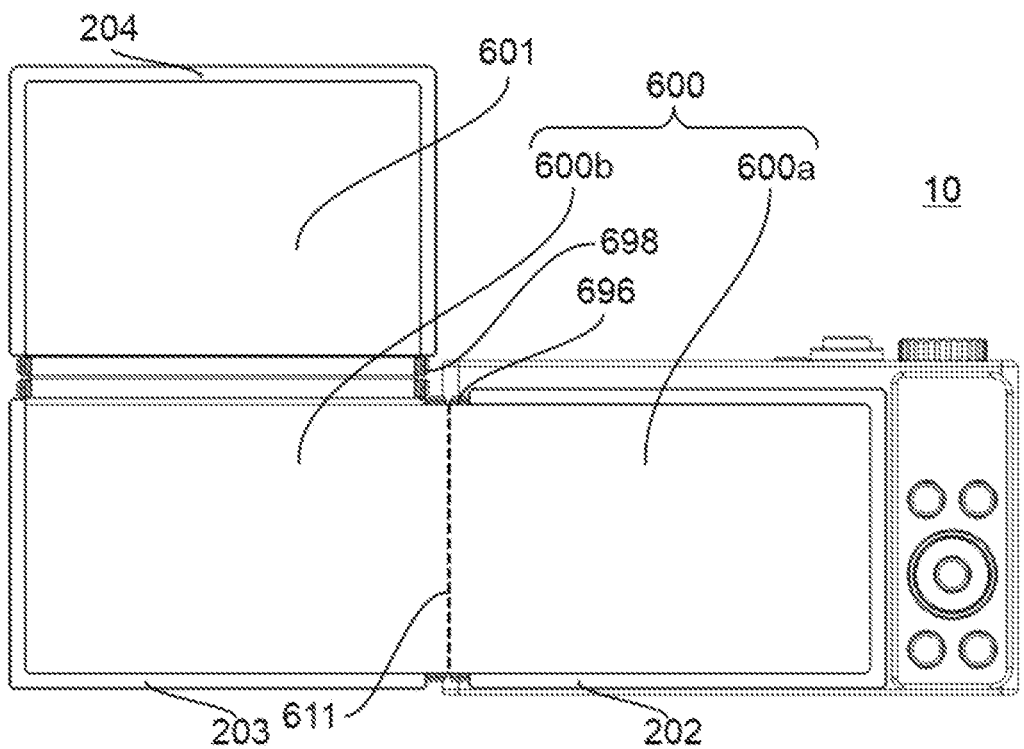

An L-shaped configuration of two displays according to the present embodiment will be described with reference to FIGS. 22A and 22B. FIGS. 22A and 22B are rear perspective views illustrating the L-shaped configuration of the two displays. FIG. 22A illustrates, as an example, a vertical bending structure, and FIG. 22B illustrates, as an example, a horizontal bending structure.

First, the structure in FIG. 22A will be described. A first display 600 is formed of a thin film-shaped material constituted by an organic EL or the like and has a rectangular shape. The first display 600 is configured to be bendable at a bending portion 611. The first display 600 is sectioned into a first display portion 600a and a second display portion 600b virtually split by the bending portion 611. The first display 600 is held by a second holding member 203 and a third holding member 204.

The second display 601 is a thin display that is bendable similarly to the first display 600. However, the second display 601 is not limited to the bendable display, and there are embodiments in which a display that cannot be bent, such as a liquid crystal display, is used as the second display 601. The second display 601 is held by the first holding member 202.

A first hinge portion 696 rotatably couples the second holding member 203 and the third holding member 204. The first hinge portion 696 is disposed near the bending portion 611 on the rear side of the first display 600. The first hinge portion 696 is rotatable by about 360°. A second hinge portion 698 is rotatably couples the first display 600 to the second display 601. The second hinge portion 698 is rotatable by about 180°. In regard to the coupling position, a configuration with substantially the L shape by combining the first display 600 and the second display 601 is achieved. The first hinge portion 696 and the second hinge portion 698 have similar structures as those in the fourth embodiment.

Next, the structure in FIG. 22B will be described. The first display 600 is held by the first holding member 202 and the second holding member 203. The second display 601 is held by the third holding member 204.

The first hinge portion 696 rotatably couples the first holding member 202 to the second holding member 203. The first hinge portion 696 is disposed near the bending portion 611 on the rear side of the first display 600. The first hinge portion 696 is rotatable by about 180°.

The second hinge portion 698 rotatably couples the first display 600 to the second display 601. Also, the second hinge portion 698 is rotatable by about 360°. In regard to the coupling position, the substantially L-shaped configuration is achieved by combining the first display 600 and the second display 601.

According to the present embodiment, a configuration similar to that in the fourth embodiment can be achieved by configuring the two displays in the L shape.

Although the preferred embodiments of the present invention have been described above, the present invention is not limited to these embodiments, and various modifications and changes can be made within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-025108 filed on Feb. 19, 2021, which is hereby incorporated by reference herein in its entirety.

What is claimed is:

1. An electronic apparatus comprising:
a display that at least partially has flexibility; and
a main body portion,
wherein the display includes a plurality of display portions, has a bending portion at each of boundaries of the plurality of display portions, and is configured to be bendable at the bending portion as a start point in response to rotation of a hinge portion that is relatively rotatably coupled to first and second display portions and a hinge portion that is relatively rotatably coupled to second and third display portions among the plurality of display portions, and
the electronic apparatus further comprises a detector that detects a posture of the electronic apparatus and a controller that performs control for switching a display position of the display depending on a posture of the electronic apparatus detected by the detector,
wherein the display includes
a first bending portion at a boundary between the first display portion and the second display portion, and
a second bending portion at a boundary between the first display portion and the third display portion,
a first hinge portion that is relatively rotatably coupled to the first display portion and the second display portion is included near the first bending portion,
a second hinge portion that is relatively rotatably coupled to the first display portion and the third display portion is included near the second bending portion,
the second display portion is able to be unfolded in a first direction relative to the first display portion, and the third display portion is able to be unfolded in a second direction relative to the first display portion,
wherein the electronic apparatus further comprises:
a first imager;
a second imager that is disposed in the first display portion; and
a first rotation angle detector that detects a rotation angle θ1 of the first hinge portion,
wherein in a case in which a condition of 90°≤θ1<180° is satisfied and high-angle imaging is performed, the second display portion displays an image acquired by the first imager, and
wherein the controller determines a display position of the display on the basis of information acquired by the second imager and a result of detecting a posture of the electronic apparatus obtained by the detector.

2. An electronic apparatus comprising:
a display that at least partially has flexibility; and
a main body portion,
wherein the display includes a plurality of display portions, has a bending portion at each of boundaries of the plurality of display portions, and is configured to be bendable at the bending portion as a start point in response to rotation of a hinge portion that is relatively rotatably coupled to first and second display portions and a hinge portion that is relatively rotatably coupled to second and third display portions among the plurality of display portions, and
the electronic apparatus further comprises a detector that detects a posture of the electronic apparatus and a controller that performs control for switching a display position of the display depending on a posture of the electronic apparatus detected by the detector,
wherein the display includes
 a first bending portion at a boundary between the first display portion and the second display portion, and
 a second bending portion at a boundary between the first display portion and the third display portion,
 a first hinge portion that is relatively rotatably coupled to the first display portion and the second display portion is included near the first bending portion,
 a second hinge portion that is relatively rotatably coupled to the first display portion and the third display portion is included near the second bending portion,
 the second display portion is able to be unfolded in a first direction relative to the first display portion, and
 the third display portion is able to be unfolded in a second direction relative to the first display portion,
wherein the electronic apparatus further comprises:
a first imager;
a second imager that is disposed at the first display portion; and
a first rotation angle detector that detects a rotation angle θ1 of the first hinge portion,
wherein in a case in which a condition of 180°<θ1≤270° is satisfied and low-angle imaging is performed, the second display portion displays an image acquired by the first imager,
wherein the controller determines a display position of the display on the basis of information acquired by the second imager and a result of detecting a posture of the electronic apparatus obtained by the detector.

3. An electronic apparatus comprising:
a display that at least partially has flexibility; and
a main body portion,
wherein the display includes a plurality of display portions, has a bending portion at each of boundaries of the plurality of display portions, and is configured to be bendable at the bending portion as a start point in response to rotation of a hinge portion that is relatively rotatably coupled to first and second display portions and a hinge portion that is relatively rotatably coupled to second and third display portions among the plurality of display portions, and
the electronic apparatus further comprises a detector that detects a posture of the electronic apparatus and a controller that performs control for switching a display position of the display depending on a posture of the electronic apparatus detected by the detector,
wherein the display includes
 a first bending portion at a boundary between the first display portion and the second display portion, and
 a second bending portion at a boundary between the first display portion and the third display portion,
a first hinge portion that is relatively rotatably coupled to the first display portion and the second display portion is included near the first bending portion,
a second hinge portion that is relatively rotatably coupled to the first display portion and the third display portion is included near the second bending portion,
the second display portion is able to be unfolded in a first direction relative to the first display portion, and
the third display portion is able to be unfolded in a second direction relative to the first display portion,
wherein the electronic apparatus further comprises:
a first imager;
a second imager that is disposed at the first display portion; and
a second rotation angle detector that detects a rotation angle θ2 of the second hinge portion,
wherein in a case in which a condition of 90°≤θ2<180° is satisfied and low-angle imaging is performed, the third display portion displays an image acquired by the first imager,
wherein the controller determines a display position of the display on the basis of information acquired by the second imager and a result of detecting a posture of the electronic apparatus obtained by the detector.

4. An electronic apparatus comprising:
a display that at least partially has flexibility; and
a main body portion,
wherein the display includes a plurality of display portions, has a bending portion at each of boundaries of the plurality of display portions, and is configured to be bendable at the bending portion as a start point in response to rotation of a hinge portion that is relatively rotatably coupled to first and second display portions and a hinge portion that is relatively rotatably coupled to second and third display portions among the plurality of display portions, and
the electronic apparatus further comprises a detector that detects a posture of the electronic apparatus and a controller that performs control for switching a display position of the display depending on a posture of the electronic apparatus detected by the detector,
wherein the display includes
 a first bending portion at a boundary between the first display portion and the second display portion, and
 a second bending portion at a boundary between the first display portion and the third display portion, a first hinge portion that is relatively rotatably coupled to the first display portion and the second display portion is included near the first bending portion,
a second hinge portion that is relatively rotatably coupled to the first display portion and the third display portion is included near the second bending portion,
the second display portion is able to be unfolded in a first direction relative to the first display portion, and
the third display portion is able to be unfolded in a second direction relative to the first display portion,
wherein the electronic apparatus further comprises:
a first imager;
a second imager that is disposed at the first display portion; and
a second rotation angle detector that detects a rotation angle θ2 of the second hinge portion,
wherein in a case in which a condition of 180°≤θ2≤270° is satisfied and high-angle imaging is performed, the third display portion displays an image acquired by the first imager,
wherein the controller determines a display position of the display on the basis of information acquired by the second imager and a result of detecting a posture of the electronic apparatus obtained by the detector.

5. An electronic apparatus comprising:
a display that at least partially has flexibility; and
a main body portion,
wherein the display includes a plurality of display portions, has a bending portion at each of boundaries of the plurality of display portions, and is configured to be bendable at the bending portion as a start point in response to rotation of a hinge portion that is relatively rotatably coupled to first and second display portions and a hinge portion that is relatively rotatably coupled to second and third display portions among the plurality of display portions, and
the electronic apparatus further comprises a detector that detects a posture of the electronic apparatus and a controller that performs control for switching a display position of the display depending on a posture of the electronic apparatus detected by the detector,
wherein a size of the first display portion is equal to or greater than a total size of the second and third display portions.

6. The electronic apparatus according to claim 5, wherein the display includes
a first bending portion at a boundary between the first display portion and the second display portion, and
a second bending portion at a boundary between the first display portion and the third display portion,
a first hinge portion that is relatively rotatably coupled to the first display portion and the second display portion is included near the first bending portion,
a second hinge portion that is relatively rotatably coupled to the first display portion and the third display portion is included near the second bending portion,
the second display portion is able to be unfolded in a first direction relative to the first display portion, and
the third display portion is able to be unfolded in a second direction relative to the first display portion.

7. The electronic apparatus according to claim 6, wherein a holding member of the first display portion is coupled to the main body portion via a coupling portion.

8. The electronic apparatus according to claim 7, wherein the coupling portion is able to turn around an axis that is substantially perpendicular to the first and second bending portions.

9. The electronic apparatus according to claim 6, wherein the first and second bending portions are able to be bent in a range of 0° to 270°, and the display is able to be bent on a first side in a range of 180° and is able to be bent on a second side, which is opposite to the first side, in a range of 90°.

* * * * *